United States Patent
Vacanti et al.

(10) Patent No.: US 11,906,617 B2
(45) Date of Patent: *Feb. 20, 2024

(54) RADAR USING PERSONAL PHONE, TABLET, PC FOR DISPLAY AND INTERACTION

(71) Applicant: Honeywell International Inc., Morris Plains, NJ (US)

(72) Inventors: David C. Vacanti, Renton, WA (US); Jeffrey D. Radke, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 323 days.

This patent is subject to a terminal disclaimer.

(21) Appl. No.: 16/917,021

(22) Filed: Jun. 30, 2020

(65) Prior Publication Data
US 2020/0333452 A1 Oct. 22, 2020

Related U.S. Application Data

(63) Continuation of application No. 15/677,844, filed on Aug. 15, 2017, now Pat. No. 10,712,438.

(51) Int. Cl.
*G01S 13/58* (2006.01)
*G01S 7/04* (2006.01)
(Continued)

(52) U.S. Cl.
CPC ............ *G01S 13/584* (2013.01); *G01S 7/003* (2013.01); *G01S 7/04* (2013.01); *G01S 7/06* (2013.01); *G01S 13/44* (2013.01)

(58) Field of Classification Search
CPC .......... G01S 13/584; G01S 7/003; G01S 7/04; G01S 7/06; G01S 13/44; G01S 13/89
See application file for complete search history.

(56) References Cited

U.S. PATENT DOCUMENTS 3,144,646 A 8/1964 Breithaupt
4,901,084 A 2/1990 Huguenin et al.
(Continued)

FOREIGN PATENT DOCUMENTS

EP D615137 A2 9/1994
EP 3367124 A1 8/2018
(Continued)

OTHER PUBLICATIONS

Natour, Ghina El, Omar Ait-Aider, Raphael Rouveure, François Berry, and Patrice Faure. 2015. "Toward 3D Reconstruction of Outdoor Scenes Using an MMW Radar and a Monocular Vision Sensor" Sensors 15, No. 10: 25937-25967. https://doi.org/10.3390/s151025937 (Year: 2015).*

(Continued)

*Primary Examiner* — Olumide Ajibade Akonai
*Assistant Examiner* — Yonghong Li
(74) *Attorney, Agent, or Firm* — Shumaker & Sieffert, P.A.

(57) ABSTRACT

A portable radar system that may leverage the processing power, input and/or display functionality in mobile computing devices. Some examples of mobile computing devices may include mobile phones, tablet computers, laptop computers and similar devices. The radar system of this disclosure may include a wired or wireless interface to communicate with the mobile computing device, or similar device that includes a display. The radar system may be configured with an open set of instructions for interacting with an application executing on the mobile computing device to accept control inputs as well as output signals that the application may interpret and display, such as target detection and tracking. The radar system may consume less power than other radar systems. The radar system of this disclosure (Continued)

may be used for a wide variety of applications by consumers, military, law enforcement and commercial use.

19 Claims, 13 Drawing Sheets

(51) Int. Cl.
  *G01S 7/00* (2006.01)
  *G01S 7/06* (2006.01)
  *G01S 13/44* (2006.01)

(56) References Cited

U.S. PATENT DOCUMENTS

| | | | | |
|---|---|---|---|---|
| 7,973,704 | B2* | 7/2011 | Storz | G01S 7/24 |
| | | | | 342/146 |
| 8,004,454 | B2 | 8/2011 | Lindoff et al. | |
| 8,406,466 | B2 | 3/2013 | He | |
| 8,519,885 | B2 | 8/2013 | Ash, Jr. et al. | |
| 8,884,809 | B2 | 11/2014 | Hyde et al. | |
| 9,547,070 | B2* | 1/2017 | Corcos | G01S 13/88 |
| 9,972,917 | B2* | 5/2018 | Vacanti | G01S 13/4463 |
| 2005/0225481 | A1* | 10/2005 | Bonthron | H01Q 21/0093 |
| | | | | 342/175 |
| 2011/0199263 | A1* | 8/2011 | Kang | G01S 3/04 |
| | | | | 342/442 |
| 2016/0131741 | A1* | 5/2016 | Park | G01S 13/42 |
| | | | | 342/194 |
| 2017/0104276 | A1 | 4/2017 | Vacanti et al. | |
| 2017/0160389 | A1 | 6/2017 | Vacanti | |
| 2017/0328997 | A1* | 11/2017 | Silverstein | G01S 13/765 |
| 2017/0343667 | A1 | 11/2017 | Vacanti et al. | |
| 2018/0149737 | A1* | 5/2018 | Kim | H01Q 21/061 |
| 2019/0056488 | A1 | 2/2019 | Vacanti et al. | |

FOREIGN PATENT DOCUMENTS

| | | | |
|---|---|---|---|
| WO | 2007/057474 A1 | 5/2007 | |
| WO | WO-2007057474 A1 * | 5/2007 | ........... G01S 13/227 |
| WO | 2009100153 A1 | 8/2009 | |

OTHER PUBLICATIONS

Ethernet—Wikipedia.pdf from https://web.archive.org/web/20161215111757/https://en.wikipedia.org/wiki/Ethernet (Year: 2016).*
Synthetic vision system—Wikipedia.pdf from https://web.archive.org/web/20161001173318/https://en.wikipedia.org/wiki/Synthetic_vision_system (Year: 2016).*
"Field of regard—Wikipedia,pdf" from https://web.archive.org/web/20161130054142/https://en.wikipedia.org/wiki/Field_of_regard (Year: 2016).*
"Radar cross-section—Wikipedia.pdf" from https://web.archive.org/web/20161217121439/https://en.wikipedia.org/wiki/Radar_cross-section (Year: 2016).*
Response to Examination Report dated Mar. 15, 2021, from counterpart European Application No. 18188115.2, filed Jul. 14, 2021, 10 pp.
Examination Report from counterpart European Application No. 18188115.2, dated Mar. 15, 2021, 4 pp.
Response to Extended Search Report dated Jan. 7, 2019, from counterpart European Application No. 18188115.2, filed Jun. 28, 2019, 9 pp.
Extended Search Report from counterpart European Application No. 18188115.2, dated Jan. 7, 2019, 13 pp.
Sharma, et al., "Miniature Radar for Mobile Devices," 2013 IEEE, Sep. 10-12, 2013, 8 pp.
U.S. Appl. No. 15/457,844, by David C. Vacanti, filed Mar. 13, 2017.
Prosecution History from U.S. Appl. No. 15/677,844, dated Sep. 13, 2019 through Mar. 13, 2020, 51 pp.
Notice of Intent to Grant and Text Intended to Grant from counterpart European Application No. 18188115.2 dated Jun. 29, 2022, 50 pp.

* cited by examiner

SIW RECEIVER ARRAY
122A

RADAR USING PERSONAL PHONE, TABLET, PC FOR DISPLAY AND INTERACTION

This application is a continuation of U.S. application Ser. No. 15/677,844, filed on Aug. 15, 2017, the entire content of which is incorporated by reference herein.

TECHNICAL FIELD

The disclosure relates to radar and radar displays.

BACKGROUND

Existing radar systems are typically expensive, bulky, consume a significant amount of power, and require expertise in radar systems to configure and use. Some examples of existing radar systems include a rotating antenna and proprietary display and control units.

SUMMARY

In general, the disclosure is directed to a low cost, portable radar system that may leverage the processing power, input and/or display functionality in mobile computing devices. Some examples of mobile computing devices may include mobile phones, tablet computers, personal computers such as laptop computers and similar devices. The radar system of this disclosure may include a wired or wireless interface to communicate with the mobile computing device, or similar device that includes a display. The radar system may be configured with an open set of instructions for interacting with an application executing on the mobile computing device to accept control inputs as well as output signals that the application may interpret and display, such as target detection and tracking. The radar system may consume less power than other radar systems. The radar system of this disclosure may be used for a wide variety of applications by consumers, military, law enforcement and commercial use.

In one example the disclosure is directed to a radar system comprising: a transmit array comprising a plurality of transmit antenna elements, radar transmitter electronics in signal communication with the transmit array, wherein the radar transmitter electronics, in conjunction with the transmit array, are configured to output a frequency modulation continuous wave (FMCW) transmit beam that illuminates an area with a greater extent in a first illumination direction than in a second illumination direction. The second illumination direction is substantially perpendicular to the first illumination direction. The radar system further comprises a receive array comprising a plurality of receive antenna elements, and radar receiver electronics operable to: receive a plurality of receive signals from the receive array, and processing circuitry operable to: digitally form a receive beam from the plurality of receive signals, determine one or more characteristics of a sub-area of the area illuminated by the FMCW transmit beam, wherein the sub-area is within the receive beam, establish a communication session with an external display device, and output a signal to an external display device. The signal to the external display device may comprise: target detection information in three dimensions, the three dimensions including range, azimuth and elevation, and target movement characteristics, including relative velocity and angular velocity.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure is directed to a radar system that leverages the processing power, input functionality and/or display functionality in mobile computing devices. The radar system of this disclosure includes features that may enable the radar system to be manufactured at a low cost and in a portable form factor. Some examples of mobile computing devices that may be used in conjunction with the radar devices described herein include mobile phones, tablet computers, laptop computers and similar devices. The radar system of this disclosure may include a standard wired or wireless interface to communicate with the mobile computing device, or other device that includes a display. The radar system may communicate with an application executing on the mobile computing device to accept control inputs and output low level signals, such as target detection and tracking, that the application may interpret and display. The radar system of this disclosure may be used for a wide variety of applications by consumers, military, law enforcement, and commercial use. Some examples may include hand-held use, such as attaching the portable radar system directly to a mobile computing device, installing the portable radar system in an unmanned vehicle, such as a ground robot or aerial vehicle, or other vehicle such as a boat. In some examples, the signal output to the external display device is compatible with a synthetic vision system (SVS).

Some examples of inputs that a portable radar system of this disclosure may be configured to accept include mode settings such as vehicle detection, navigation mode and the like. Other examples of inputs include global positioning system (GPS) location information.

A portable radar system of this disclosure may consume less power than other radar systems and be configured with an open set of application program interface (API) instructions. An API is a set of routines, protocols, and tools for building software applications. An API specifies how software components interact and is a set of commands, functions, protocols, and objects that programmers can use to create software or interact with an external system. An API provides developers with standard commands for performing common operations, which simplifies code development.

Figure 1A:
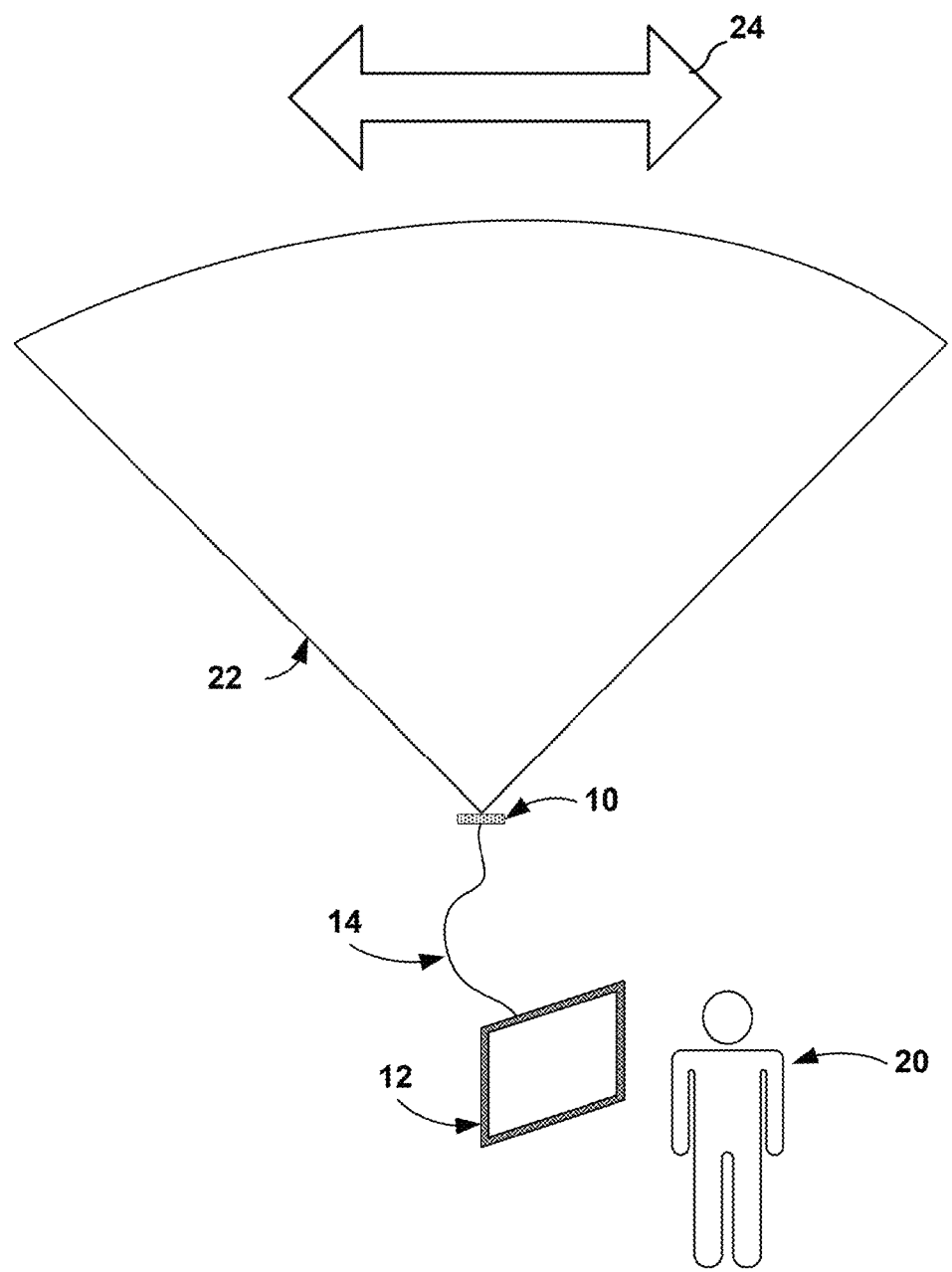
FIG. 1A is a conceptual diagram illustrating an example portable radar system according to one or more techniques of this disclosure.

FIG. 1A is a conceptual diagram illustrating an example portable radar system according to one or more techniques of this disclosure. Though FIG. 1A depicts one example application, other example applications, compatible with the system of FIG. 1A, will be discussed below, and furthermore, the radar system of this disclosure may be useful for numerous other applications not explicitly mentioned in this disclosure.

The arrangement of FIG. 1A depicts portable radar system 10 connected to a mobile computing device 12 via communication link 14. Portable radar system 10 is configured to generate transmit beam 22 and receive reflections of transmit beam 22. In some examples, operator 20 may view the output of portable radar system 10 and provide inputs to portable radar system 10 via mobile computing device 12.

Portable radar system 10 may detect and track targets by receiving radar signals reflected from the targets, i.e., reflections of transmit beam 22 that reflect from the targets. Portable radar system 10 processes the received radar signals and provides an output, which may be received and interpreted by mobile computing device 12. Some examples of targets include vehicles, such as unmanned aerial vehicles (UAV) or boats, structures, such as buildings or river locks, natural land masses, such as a mountain and similar targets. In some examples, radar receiver electronics are operable to detect targets of a cross-sectional area of half a square meter (0.5 m$^2$) at a range of one nautical mile (1 nm). A nautical mile is approximately 1852 meters or 2000 yards.

Portable radar system 10 may be manually aimed to place an area of interest (AOI) within the field of regard (FOR) of portable radar system 10. In some examples, portable radar system 10 may be a hand-held device, which may be connected, either wired or wirelessly, to mobile computing device 12. Mobile computing device 12 may be any sort of mobile computing device, such as a hand held mobile computing device such as a smart phone or a tablet computer, or mobile computing device 12 may be a larger device such as a personal computer. Operator 20 may point portable radar system 10 toward an AOI and review the output from portable radar system 10 on mobile computing device 12. In other examples, portable radar system 10 may be mounted to an object, such as a stake or pole and manually aimed toward an AOI. In other examples, portable radar system 10 may be mounted to a vehicle, such as the mast of a boat, on an aircraft, UAV or other vehicle.

Portable radar system 10 may include a transmit and receive antennae, processing circuitry, a power supply, and one or more input and output (I/O) connection. The antennae, processing circuitry and other components may be configured as a single, integrated unit. In other words, portable radar system 10 may be a radar system configured to manage all the radar signal processing tasks and output target information to a computing device or display, such as mobile computing device 12.

Communication link 14 may be a wired or wireless communication link. Some examples of wired communication include Ethernet, universal serial bus (USB) or similar wired communication links. Examples of wireless communication links may include inductive communication, Bluetooth, WiFi, or other similar wireless communications or signal transfer.

Portable radar system 10 may output transmit beam 22 as a high aspect ratio FMCW transmit beam that is wider in first illumination direction 24 than a second direction (i.e., a direction going into or coming out of the page with respect to FIG. 1A). In some examples, the first illumination direction is the horizontal direction with respect to a ground surface. Portable radar system 10 may include processing circuitry configured to digitally form a receive beam from the receive signals reflected from targets in the portable radar system's FOR. In other words, portable radar system 10 may use digital beam forming (DBF), including monopulse receive beams, to determine characteristics of a target.

Portable radar system 10 may include an open API that both outputs target information in a standardized format as well as receives commands and other inputs. Unlike other radar systems, portable radar system 10 provides flexibility and simplicity for developers to interact with portable radar system 10 to both display target information and provide inputs to portable radar system 10. Existing radar systems typically require a proprietary display device that only works with a particular radar system. Existing radar systems are also typically configured with a limited set of outputs and accept very few, if any inputs to adjust the function of the radar system.

In contrast, portable radar system 10 may be configured to receive inputs to control the functions of portable radar system 10 depending on the operating conditions from users via a simple, non-proprietary application, such as an iOS or Android-based application running on a smartphone or tablet. For example, portable radar system 10 may be mounted in a marine vessel, such as a boat, occupied by operator 20. Operator 20 may select a navigation mode in an application executing on mobile computing device 12. The selected navigation mode may cause portable radar system 10 to respond to input from mobile computing device 12 by changing a modulation frequency, transmit frequency or other radar parameter to better display land masses or structures that may be used for navigation. In another example, operator 20 may select a target tracking mode that causes portable radar system 10 to respond by adjusting radar operating parameters to emphasize vessels nearby that may be a collision hazard for operator 20. Some examples additional operating parameters that transmit electronics are further operable to change may include the modulation waveform, modulation bandwidth or chirp time of the FMCW transmit beam. In other words, in some examples, one of the features of portable radar system 10 that operator 20 may modify via mobile computing device 12 is to change the receiver beam scanning strategy to optimize the performance of the intended application via the API programming. The beam scanning may be adjusted in both azimuth (AZ) and elevation (EL) directions Portable radar system 10 may provide advantages over existing radar systems that output radar sensor information to an external display device. Existing radar systems may be limited to proprietary display devices that only work with the particular radar system. Some examples of existing radar systems include a rotating antenna which requires complex set up. In contrast, the portable radar system of this disclosure may be small, portable, consume low power that may be provided by a small battery, output a low power transmit beam that is safe for handheld operation, such as mounted to a mobile computing device 12. In contrast, some examples of existing radar systems consume significantly more power, and the output power of the transmit beam may require a minimum safe distance from an operator, such as operator 20.

Other examples of existing radar systems include portable radar systems. In these examples, however, the existing portable radar systems may have limited or no input or control capability, other than turning the existing portable radar system on or off. Examples of these existing portable radar systems include radar systems such as those used on vehicles, such as automobiles, to detect the distance to other vehicles on the road. These existing radar systems may also be limited to outputting information that requires an in-depth understanding of radar systems to interpret and display.

In contrast, portable radar system 10 of this disclosure may be configured to accept various control inputs from a computing device, such as mobile computing device 12. The inputs to portable radar system 10 may adapt the operation of portable radar system 10 to change transmit frequencies, modulation scheme or frequency and other operating parameters to adapt operation to a particular application. For example, portable radar system 10 may receive inputs to operate in a first manner when configured to detect personnel or small vehicles near a military encampment or border control application. Portable radar system 10 may operate in a different manner when configured for navigation onboard a boat operating in a low visibility environment, such as fog. In some examples, portable radar system 10 may operate in the millimeter wave frequency range. In other examples, portable radar system 10 may operate in the microwave frequency range.

Portable radar system 10, of this disclosure also may output target and obstacle detection information in a format that an application developer for a computing device may incorporate into an application to display and interpret. Portable radar system 10 may manage all radar signal processing and only output target and obstacle information that does not require an in-depth understanding of radar function to incorporated into an application. In other words, processing circuitry of portable radar system 10 may output a signal to an external display device, such as mobile computing device 12 such that the signal includes an encoding scheme compatible with the external display device.

For example, portable radar system 10 may be mounted in a radome, or similar enclosure on a small aircraft that may not normally be capable of carrying a weather radar. Portable radar system 10 may output target and obstacle information to a situational awareness application executing on mobile computing device 12. The situational awareness application may be used by pilots for navigation and other situational awareness. The developer for the pilot situational awareness application may incorporate the target information from portable radar system 10 to improve real-time pilot situational awareness by displaying nearby aircraft, UAVs, buildings, radio towers and other possible hazards. One or more portable radar systems 10 may be mounted as a network on a helicopter, for example, for situational awareness such as in reduced visibility environments, including when operating near terrain, buildings, bridges or other structures. In another example, portable radar system 10 may be installed on a UAV to output radar information to the UAV operator.

Figure 1B:
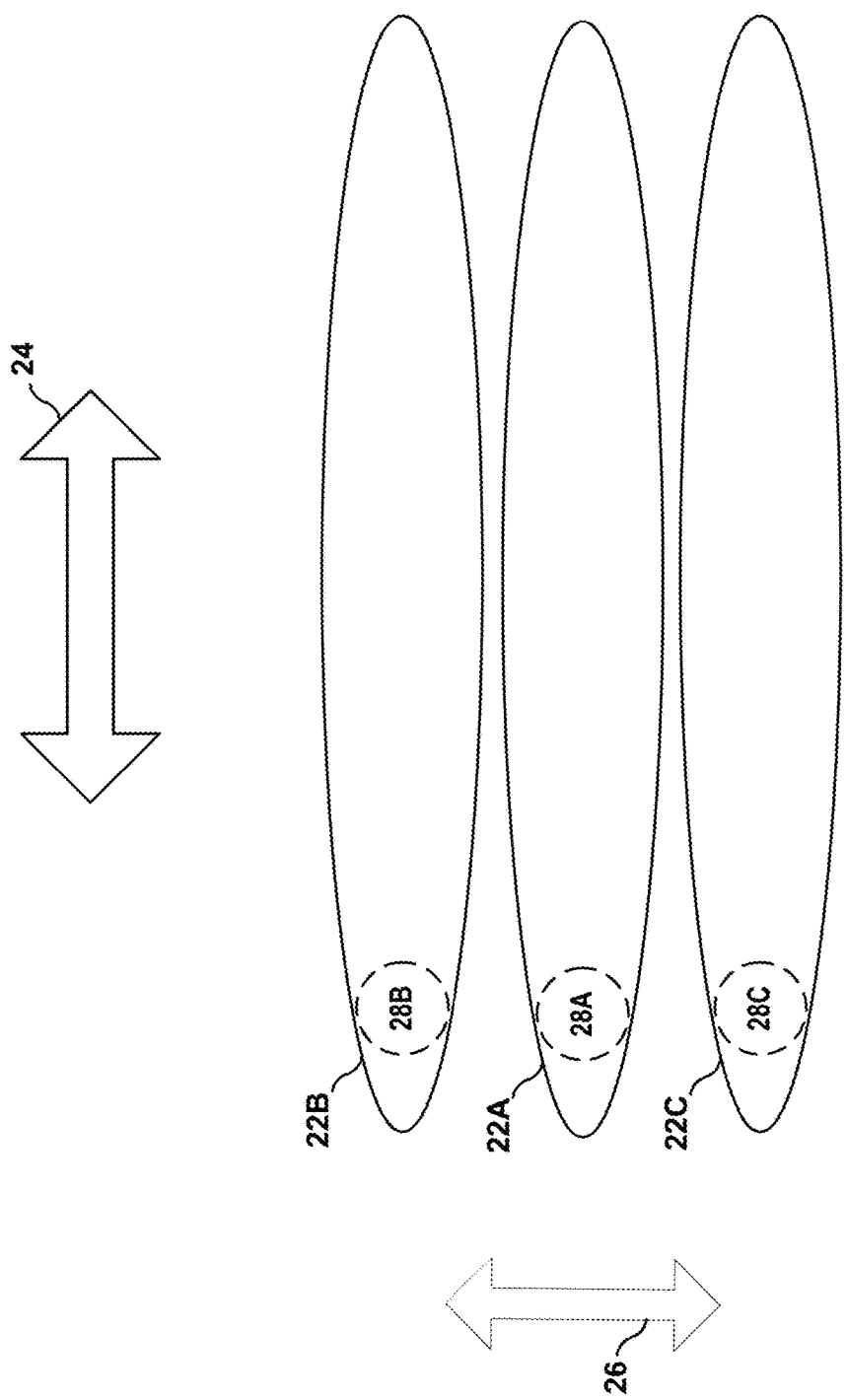
FIG. 1B is a conceptual diagram illustrating an example transmit and receive beam of a portable radar system in accordance with one or more techniques of this disclosure.

FIG. 1B is a conceptual diagram illustrating an example transmit and receive beam of a portable radar system in accordance with one or more techniques of this disclosure. Radar transmit beam 22A and first illumination direction 24 corresponds to transmit beam 22 and first illumination direction 24 depicted in FIG. 1A.

In some examples, azimuth scanning may be adjusted to permit three or more elevation positions without physically moving portable radar system 10. In one example, the transmit beam 22B, and associated receive beam 28B, may be tilted up by one beamwidth. The example of transmit beam 22A, and associated receive beam 28A may be considered set to zero tilt. The example of transmit beam 22C, and receive beam 28C, may be tilted down by one beamwidth.

Transmit beam 22A of FIG. 1B is an FMCW radar transmit beam that illuminates an area with a greater extent in a first illumination direction 24 (e.g., in azimuth) than in a second illumination direction 26 (e.g., in elevation). The second illumination direction 26 is substantially perpendicular to the first illumination direction 24. In other words, transmit beam 22A is a high-aspect ratio transmit beam that covers an AOI as determined by operator 20 (not shown in FIG. 1B). In some examples, the beamwidth of transmit beam 22A in the first illumination direction 24 is greater than 65 degrees and less than eight degrees in the second illumination direction 26. Transmit beam 22A is fixed, in other words, portable radar system 10 does not scan transmit beam 22A in the first illumination direction 24 or second illumination direction 26. Operator 20, for example, when using portable radar system 10 in a hand-held application may manually scan transmit beam 22A. In some examples, portable radar system 10 and mobile computing device 12 (not shown in FIG. 1B) may communicate to determine the direction of transmit beam 22A, such as a compass azimuth.

FIG. 1B depicts a receive beam 28. Portable radar system 10 may digitally form receive beam 28 to scan across the FOR covered by transmit beam 22A. In some examples, the receive beams may be monopulse receive beams. Processing circuitry of portable radar system 10 may use receive beam 28 to determine the position of a target and to track the target's motion. For example, track vehicles or personnel movements in a law enforcement or military application. Some examples of target detection information may include target detection information in three dimensions, the three dimensions may include position or location such as range, azimuth and elevation in relation to portable radar system 10. Target location may be determined as grid coordinates, such as latitude and longitude, as well as elevation. Other target detection information may include distance, speed, elevation, acceleration, size or any combination of a target object at a specific direction with respect to portable radar system 10.

The processing circuitry may be further operable to determine characteristics of ground-based features in the sub-area covered by receive beam 28, such as structures, mountains, and the like. Some characteristics of ground-based features may include size, shape, location, and density. For example, a solid metal object may appear differently on the display than a wooden or similar object that has lower radar reflectivity. In other examples, portable radar system 10 may perform Doppler analysis of a target's movement. Details of the transmit and receive beams will be covered in more detail below, for example in relation to FIGS. 3B and 4.

In some examples, receive beam 28 is a first receive beam, and the processing circuitry is further operable to generate a second receive beam different from the first receive beam. Portable radar system 10 may be configured to use the second receive beam to simultaneously perform more than one function. In other words, the processing circuitry is further operable to generate a second receive beam different from the first receive beam, and the processing circuitry is operable to determine one or more characteristics of a second sub-area simultaneously with determining characteristics of the first sub-area. As one example, the first receive beam may track the movement and location of a first target and the processing circuitry may use the second receive beam to simultaneously perform Doppler analysis on a second target.

Figure 2:
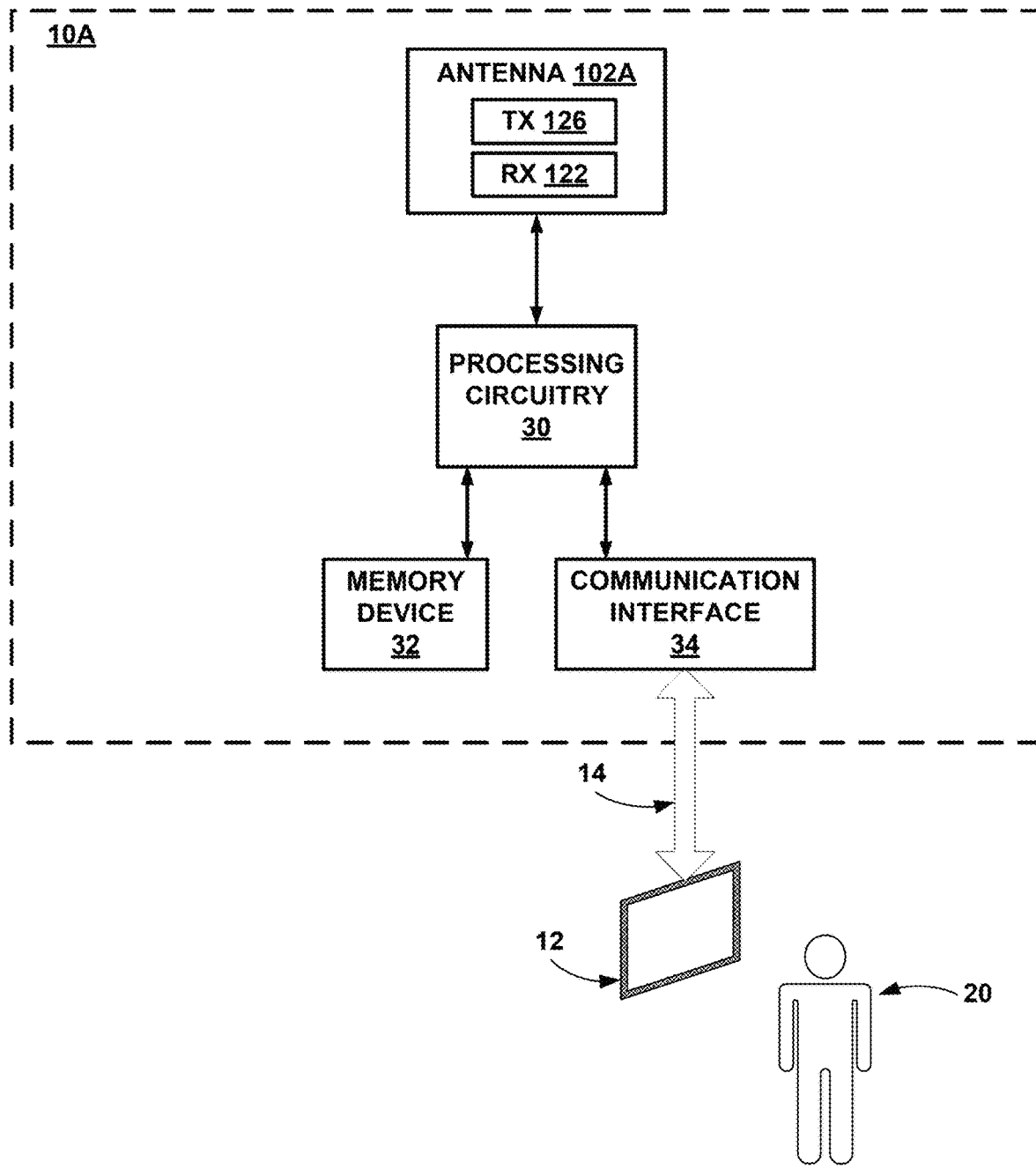
FIG. 2 is a conceptual block diagram illustrating an example portable radar system in accordance with one or more techniques of this disclosure.

FIG. 2 is a block diagram illustrating an example portable radar system in accordance with one or more techniques of this disclosure. Portable radar system 10A, operator 20, and mobile computing device 12 correspond to portable radar system 10, operator 20, and mobile computing device 12 depicted in FIG. 1A.

Example portable radar system 10A of FIG. 2 includes antenna 102A, processing circuitry 30, memory device 32, and communication interface 34. Portable radar system 10A communicates with mobile computing device 12 via communication link 14. Communication link 14 includes the same features as described above in relation to FIG. 1A.

Antenna 102A may include a substrate integrated waveguide (SIW) transmit (Tx) antenna 126 and SIW receiver (Rx) array 122. Tx antenna 126 may output the high aspect ratio transmit beam 22A as depicted in FIG. 1B above. Rx array 122 may receive FMCW radar signals reflected from targets or objects. Tx antenna 126 and Rx array 122 will be discussed in more detail below, for example in relation to FIG. 3B.

Processing circuitry 30 may include radar transmitter electronics, radar receiver electronics and other processing circuitry. Processing circuitry 30 may communicate with memory device 32. For example, processing circuitry 30 may execute software commands stored at memory device 32. Processing circuitry 30 may also store data, such as target information at memory device 32. Processing circuitry 30 may retrieve the data from memory device 32 for output via communication interface 34 or to perform calculations or other signal processing, described in more detail below.

In some examples, portable radar system 10A may be configured to determine the location of portable radar system 10A relative to mobile computing device 12. In a hand-held example, portable radar system 10A may be directly attached to mobile computing device 12. In another example, portable radar system 10A may be mounted at some distance from mobile computing device 12. For example, in a law enforcement or border monitoring application, portable radar system 10A may be mounted on a pole or on some other structure to cause transmit beam 22A, depicted in FIG. 1B, to avoid being shadowed by geography or structures, such as a hill, trees, a building or similar obstacle. Increasing the height of portable radar system 10A in some applications may extend the FOR.

Portable radar system 10A may determine the relative location between portable radar system 10A and mobile computing device 12 by, for example, a manual input from operator 20, determining relative location by wireless means, or some other means of signal transfer. Processing circuitry 30 may determine the position of a detected target relative to portable radar system 10A, such as a range and bearing. Processing circuitry 30 may then determine the position of the target relative to mobile computing device 12 by accounting for the relative location between portable radar system 10A and mobile computing device 12 and including the relative location in the target information output to mobile computing device 12. Alternatively, the application executing on mobile computing device 12 may determine the relative position between portable radar system 10A and mobile computing device 12 and determine the target's position relative to mobile computing device 12. In other words, in some examples, portable radar system 10A may get the GPS location of mobile computing device 12 from the electronics within mobile computing device 12, and uses the received GPS location to calculate coordinates for the target.

In some examples, portable radar system 10A may determine the relative location between portable radar system 10A and mobile computing device 12 during an initial phase of operation, such as when portable radar system 10A connects to mobile computing device 12, or during power on phase of portable radar system 10A. In other examples, either the application executing on mobile computing device 12 or portable radar system 10A may determine the relative location periodically during operation.

In some examples, portable radar system 10A may be configured to receive other inputs from a computing device, such as mobile computing device 12. Other inputs may include a global position system (GPS) input indicating the GPS location of mobile computing device 12. Some examples of mobile computing device 12 may be able to determine a GPS location using built in GPS hardware, or by communicating to external GPS hardware. The GPS location may include, for example, a latitude, longitude and altitude of mobile computing device 12. Portable radar system 10A may be configured to receive the GPS location of mobile computing device 12 via communication interface 34 and incorporate the GPS location into the target information sent to mobile computing device 12. For example, portable radar system 10A may detect a UAV at a given range, bearing and altitude relative to portable radar system 10A. Processing circuitry 30 may be configured to incorporate the GPS location of mobile computing device 12 into the target information. Processing circuitry 30 may output, for example, a target range, bearing and altitude relative to mobile computing device 12. Alternatively, portable radar system 10A may be configured to incorporate the GPS information to output a latitude, longitude and altitude of the UAV to mobile computing device 12. As another example, portable radar system 10A may output the UAV location relative to portable radar system 10A and an application executing on mobile computing device 12 may determine the UAV location relative to mobile computing device 12. The UAV location, in this example, may be depicted as range, bearing and altitude, map coordinates with altitude or other means of indicating location.

In some examples, portable radar system 10A may be configured to operate as part of a network of detection devices. For example, two or more portable radar system 10A may be configured to cover a perimeter of a vehicle, object or a position. Example applications may include a military encampment to warn the occupants of approaching vehicles, personnel and other targets. Another example may include a merchant ship, or other marine vessel transiting waters with narrow passages between hazards to navigation or with a danger of pirate attack. Existing marine radar systems, such as those with rotating antennae, may have difficulty detecting objects low in the water and close to the ship, such as shoals, icebergs or small, hostile vessels. A network of portable radar systems 10 may have advantages in detecting, displaying and warning of smaller, short range obstacles or targets.

In some examples, portable radar system 10A may be part of a network that include other sensors, such as thermal imaging, audio detection, ultrasonic instruments and other sensors. A network of sensors, including portable radar system 10A, may each connect to individual display devices, such as a respective mobile computing device 12 for each sensor. In other examples, the network of sensors may connect to a central control and display system, such as in a command center of a military encampment, the bridge of a ship or similar locations.

Figure 3A:
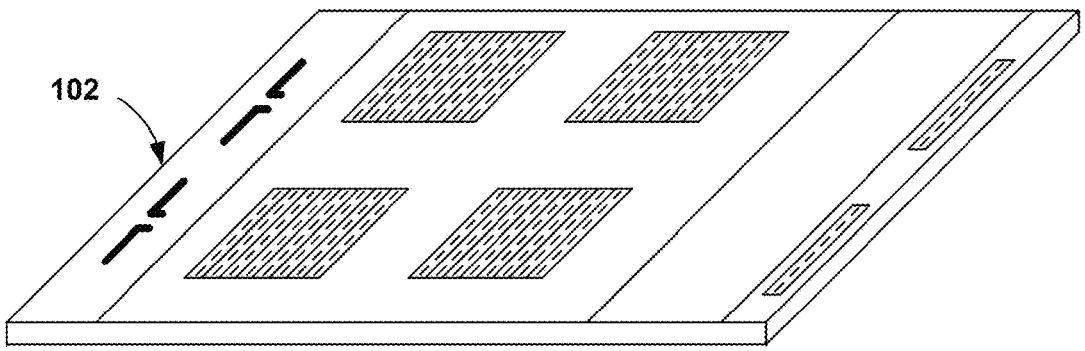
FIG. 3A is a conceptual assembly diagram illustrating an exploded view of an example radar system, which may be a component of a portable radar system in accordance with one or more techniques of this disclosure.
Figure 3A:
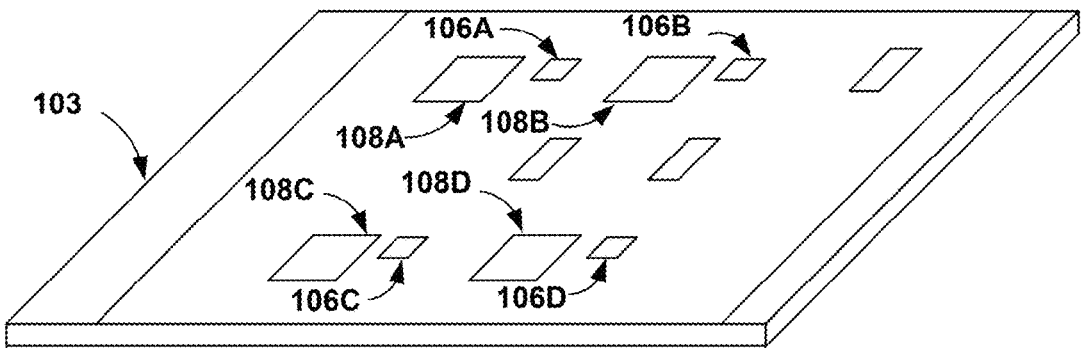
Figure 3A:
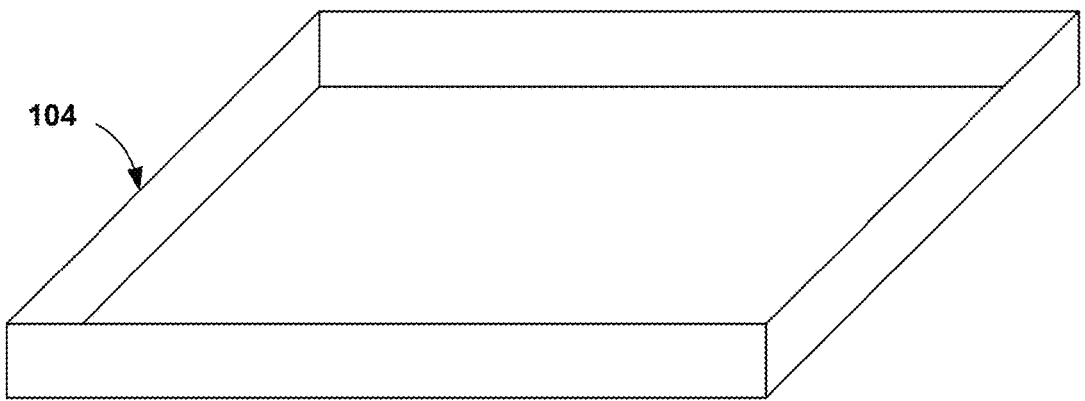

FIG. 3A is a conceptual and assembly diagram illustrating an exploded view of an example radar system, which may be a component of a portable radar system in accordance with one or more techniques of this disclosure. FIG. 2A illustrates an example radar system 100 which may include a SIW transmit and receive antennae and a protective cover or shield 104. Radar system 100 may, for example, correspond to portable radar system 10 and 10A as depicted in FIGS. 1A and 2 above. In the example of FIG. 3A, the radar system is implemented as a multi-layer printed circuit board (PCB) 101 that includes an SIW antenna layer 102 and one or more circuit layers 103. Circuit layers 103 may include receiver chips 108A-108D, analog-to-digital (A/D) converters 106A-106D as well as other circuit elements. An analog-to-digital converter may also be called an "ADC." In some examples, the antennae, and all RF components may be implemented on SIW antenna layer 102. In the example of a millimeter wave radar system, SIW antenna layer 102 may include all the millimeter wave radar components and routing elements. In some examples, the one or more circuit layers 103 may include all the digital components, power supply and similar components, such as A/D converters. In some examples, the one or more circuit layers 103 configured with the digital components, power supply and similar components may be called the "core" board. In some examples radar system 10, with the antenna, electronics, power supply and other components protected by a housing in a single, integrated package may be referred to as an integrated radar system.

Multi-layer PCB 101 may include circuits and components that implement a transmit array, radar transmitter electronics, a receive array, radar receiver electronics, processing circuitry, communication electronics, power conditioning and distribution, clock/timers and other circuitry and components. The circuits and components may be similar to processing circuitry 30, described above in relation to FIG. 2. The processing circuitry may be configured to control the radar transmitter electronics and radar receiver electronics as well as process and identify radar targets and send notifications and information to users using the communication electronics. Processing circuitry may include, any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

The SIW antenna layer 102 may be electrically connected to circuit paths and components on one or more circuit layers 103. SIW antenna layer 102 may be similar to antenna 102A described above in relation to FIG. 2. In some examples, plated vias may provide connections between one or more circuit layers 103, as well as to SIW antenna layer 102. A via may be a plated or unplated hole that may be drilled, etched or otherwise formed between layers of multi-layer PCB 101. A plated via may be plated with a conductive material to electrically connect layers. Some examples of conductive material may include copper, solder, conductive epoxy or other materials.

Protective shield 104 may cover and provide structural support for example radar system 100. Protective shield 104 may be a molded plastic, stamped or formed sheet metal or other suitable material. Protective shield 104 may include a conductive coating in one or more areas to provide shielding for electromagnetic interference (EMI). Protective shield 104 may include penetrations for power, communication or other connections as well as be configured to securely mount radar system 100. In the example of FIG. 3A, the shape of the protective shield, SIW antenna layer 102 and circuit layers 103 is rectangular. However, in other examples the components of multi-layer printed circuit board PCB 101 and protective shield 104 may be round, octagonal or other shapes.

In operation, radar system 100 may provide digital electronic beam steering on received radar reflections by using, in part, phase shift commands within the components on one or more circuit layers 103. The radar transmitter electronics, in signal communication with the radar transmit antenna, are configured to output, e.g., transmit, radar signals that are a fixed, wide beam illumination as described above in relation to FIGS. 1A, 1B and 2. The radar receiver electronics in signal communication with the radar receive antenna search the reflected radar signals by a "pencil beam" monopulse receive pattern that scans within the illuminated transmit area, which may be similar to receive beam 28 depicted in FIG. 1B and main receive lobe 410B depicted in FIG. 9B. In other words, radar system 100, in this example, is an FMCW dual antenna radar system that provides wide beam illumination on transmit and then an electronically scanned receive beam that searches within the wide transmit illumination area, or FOR.

The FMCW radar signals may provide very fine range resolution and allows very low receiver bandwidth and low data rates when compared to other examples of radar signals. This includes resolution in all three dimensions. In other words, radar system 100 may locate the X, Y and Z position of possible targets. Locating the position of a target in all three dimensions covered by the transmit beam, may have advantages, such as to differentiate between a target on the ground and a target above the ground.

Executing the digital electronic beam steering at baseband frequencies provides the advantage of reduced cost and complexity because of fewer radio frequency (RF) components. In some examples, the digital electronic beam steering according to the techniques of this disclosure may also be capable of receiving multiple simultaneous beams.

In one example, radar system 100 may use a heterodyne FMCW radar with a 16 MHz first intermediate frequency (IF) before down conversion to a baseband between 1 KHz and 2 MHz. Radar system 100 may apply the 16 MHz offset using a dual direct digital synthesis (DDS) at the transmit array. A heterodyne system may provide advantages over other FMCW radars that use a homodyne receiver to directly convert RF signals to baseband near zero frequency. Radar system 100 may include components with a passband that includes 16 MHz. These components may also provide simultaneous down conversion to base band, I/Q channel formation and four-bit phase shift. By using multi-function components along with frequency down conversion, radar system 100 may achieve performance advantages over a standard homodyne receiver, even a homodyne receiver that may use an I/Q mixer on receive. A few examples include I/Q accuracy (true 90 degree offset), four-bit phase shift, fine range and elevation resolution, low receiver bandwidth, low data rates, small size, light weight, low power consumption, integrated package. In other words, the transmit array, the receive array, the radar transmitter electronics, radar receiver electronics and the processing circuitry comprise a single, integrated package. Additionally, a radar system according to this disclosure may be configured for easy retrofit of existing platforms.

Figure 3B:
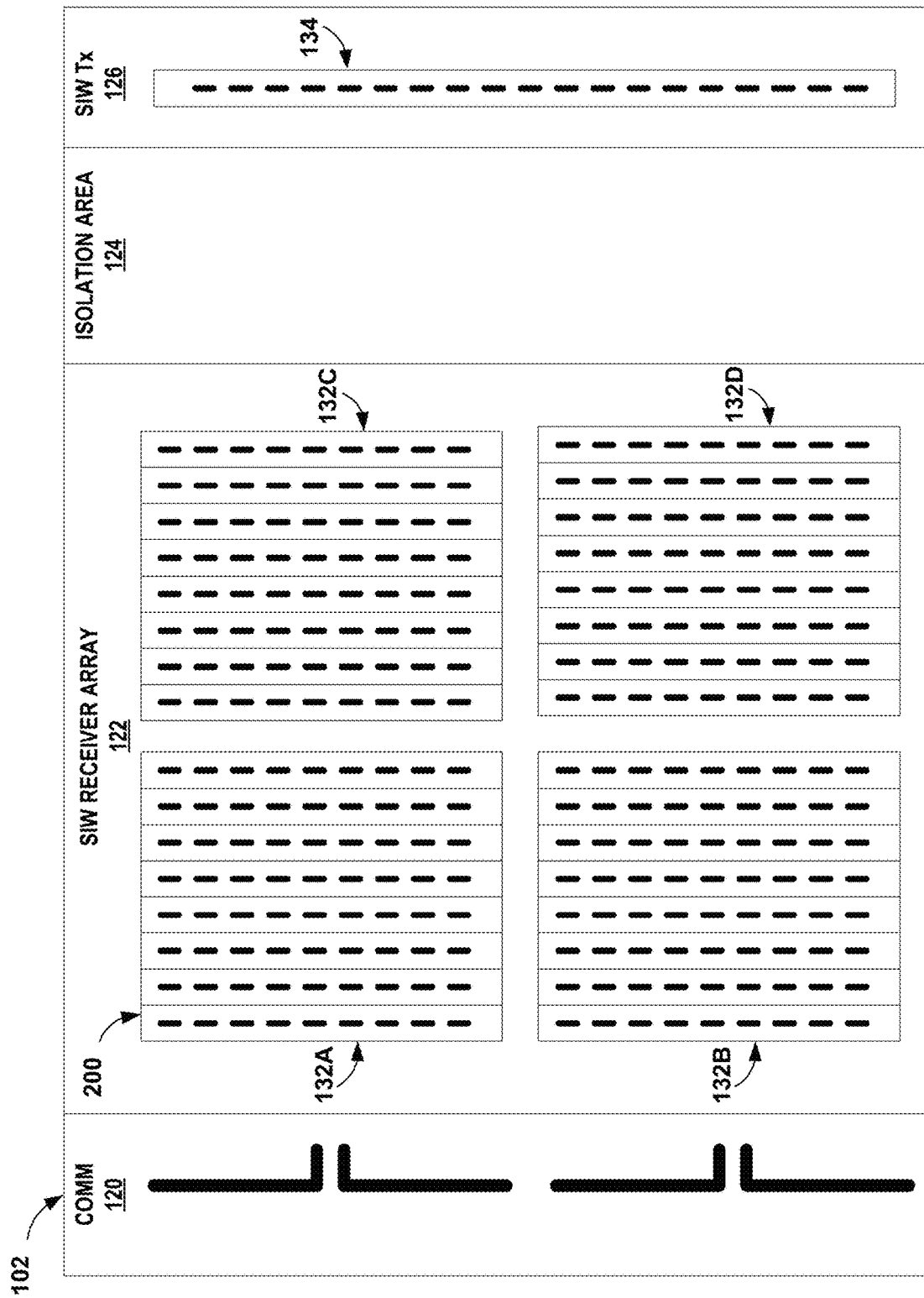
FIG. 3B is a conceptual diagram illustrating the transmission, receive and communication antennae of an example radar system in accordance with one or more techniques of this disclosure.

FIG. 3B is a conceptual diagram illustrating the transmission, receive and communication antennae of an example radar system in accordance with one or more techniques of this disclosure. FIG. 3B illustrates a more detailed view of the radiating and receiving portion of SIW antenna layer 102 shown in FIG. 3A. SIW antenna layer 102 may include a communication antenna 120, an SIW receiver (Rx) array 122, an isolation area 124 and an SIW transmit (Tx) antenna 126. SIW Rx array 122 may include one or more radar receiver antenna subarrays 132A-132D. Each subarray may include an SIW Rx array element 200. In the example of FIG. 3B, each subarray 132A-132D contains eight SIW antenna devices. For clarity, FIG. 3B only shows SIW Rx array element 200 with a reference number. SIW Rx array element 200 may also be referred to as a slotted waveguide antenna device. Therefore, SIW Rx array 122 may be considered a slotted waveguide radar receive antenna. SIW Tx antenna 126 may be considered a slotted waveguide radar transmit antenna.

SIW Tx antenna 126 (or slotted waveguide radar transmit antenna) may be in signal communication with the radar transmitter electronics. In some examples, SIW Tx antenna 126 may be referred to as a radar transmit array that includes a plurality of transmit antenna elements. The radar transmitter electronics, in conjunction with the slotted waveguide radar transmit antenna, may be configured to output radar signals to a predetermined coverage area. The predetermined coverage area may be similar to the FOR depicted in FIG. 1B. The terms radar transmit electronics and radar transmitter electronics may be used interchangeably in this disclosure.

SIW Rx array 122 (or slotted waveguide radar receive antenna) may be in signal communication with radar receiver electronics. The radar receiver electronics may include digital beam forming circuitry configured to receive radar reflections corresponding to the outputted radar signals from the radar receive antenna. The outputted radar signals may reflect off objects present in the predetermined coverage area. The radar receiver electronics may send information to the processing circuitry about the reflected signals from objects present in the FOR, or predetermined coverage area. The processing circuitry may be configured to generate a notification in response to a radar reflection received from the first coverage area.

In the example of FIG. 3B, SIW Rx array 122 includes 16 columns of SIW Rx array element 200, separated into a top and bottom set of columns. SIW Rx array 122 is further separated into a left and right set of columns of SIW Rx array element 200. The result is SIW Rx array 122 separated into four parts, i.e. subarrays 132A-132D (collectively subarrays 132). Each subarray 132 includes eight SIW Rx array element 200, which may be considered waveguide "sticks." The configuration of the example SIW Rx array 122 allows four quadrants with eight waveguide sticks (SIW Rx array element 200) in each. Portable radar system 10 uses the four quadrants (subarrays 132) for monopulse angle measurement. In other words, the four subarrays 132 allow portable radar system 10 to form a monopulse azimuth beam (AZ beam), an elevation beam (EL beam) and a sum beam.

Isolation area 124 may be used to isolate the outputted radar signals coming from SIW Tx antenna 126 from interfering with SIW Rx array 122. Isolation area 124 may have dimensions and be composed of material to ensure proper function of radar system 100. For example, isolation area 124 may be a structure such as an electronic band gap structure or an absorptive structure. The dimensions and/or material may vary depending on the operating frequency of radar system 100.

Communication antenna 120 may be configured to transmit and receive signals used to communicate using a variety of techniques, as described above in relation to FIGS. 1A, 1B and 2. Some examples may include communication over a wireless local area network (WLAN) using Wi-Fi, Bluetooth, and similar examples. In some examples, radar system 100 may communicate using either or both wireless and wired communication, as described above. Communication antenna 120 may be communicatively coupled to electronic communication circuitry within radar system 100 configured to receive information from processing circuitry within radar system 100. For example, the electronic communication circuitry may be part of multi-layer PCB 101. The electronic communication circuitry, in conjunction with Communication antenna 120 may be configured to communicate with display units or other types of units external to radar system 100. Some examples of external display units may include mobile computing device 12, tablet computers or hand-held mobile devices, as described above.

Figure 4A:
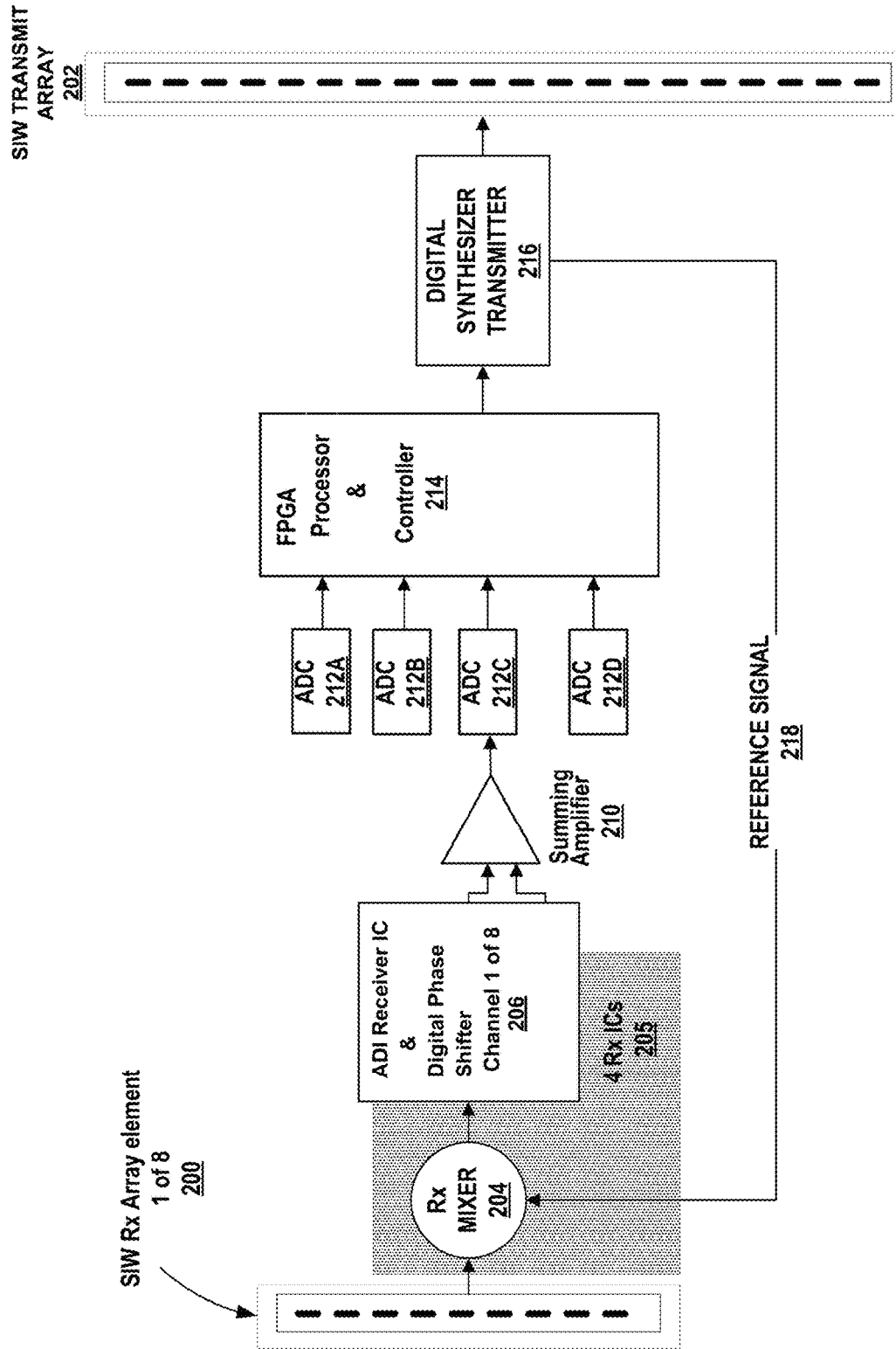
FIG. 4A is a conceptual schematic block diagram illustrating an example radar system using a slot waveguide antenna array system in accordance with one or more techniques of this disclosure.

FIG. 4A is a conceptual and schematic block diagram illustrating an example radar system using a slot waveguide antenna array system in accordance with one or more techniques of this disclosure. FIG. 4A depicts SIW Rx array element 200 and SIW Tx array 202, which function similarly to the SIW Rx array element 200 of SIW Rx array 122 and SIW Tx antenna 126 as shown in FIG. 3B. Receiver IC 206 and ADCs 212A-212D may be similar to the receiver chip 108A-108D and A/D converters 106A-106D shown in FIG. 3A. The features of receiver IC 206 will be described in further detail below. An example component that may perform some of the features of receiver IC 206 may include the AD9670 Octal Ultrasound Receiver.

Rx mixer 204 may receive inputs from SIW Rx array element 200 and reference signal 218 from digital synthesizer transmitter 216 to down-convert the reflected radar signals received by SIW Rx array element 200. Rx mixer 204 may output the downconverted radar receive signal to a respective receiver integrated circuit (IC) 206 for a respective receive channel. Receiver IC 206 may output the respective signals for the respective receive channel to a respective ADC, such as ADC 212C as shown in the example of FIG. 4A. In some examples ADC 212A-212D may be implemented by an eight-channel ADC integrated circuit, i.e. include additional ADC channels 212E-212H (not shown in FIG. 4A).

Note that FIG. 4A depicts a single SIW Rx array element 200 and a single mixer 200, however, referring to FIG. 3B, each subarray 132 has eight SIW Rx array elements 200 and eight mixers 204. In some examples, each subarray 132 may output received signals to two four-channel mixer ICs 205. In some examples, a may also include buffer amplifiers, low noise amplifiers and other circuit elements not shown in FIG. 4A for clarity. An example of a four-channel mixer may include the ADF5904 from Analog Devices. In other words, portable radar system 10, with SIW Rx array 122 may include thirty-two SIW Rx array elements 200, thirty-two mixers 204 on sixteen four-channel mixer integrated circuits 205, that output to four eight-channel ADC integrated circuits.

FPGA processor and controller 214 ("FPGA 214") may receive the digitized signals from the receive channel ADCs 212A-212C. FPGA 214 may perform the functions of, target detection processing and analysis and send target information to the external communication system to be further sent to one or more display devices. FPGA 214 may also control the radar transmitter electronics, which are configured to output radar signals in conjunction with the SIW radar transmit array 202. Radar transmitter electronics may include digital synthesizer transmitter 216. In some examples FPGA 214 may be part of a multi-processor system on chip (MPSoC) processor architecture. Some examples of MPSoC processors provide both parallel processing to form multiple receive beams as well as include several advanced reduced instruction set (RISC) machine (ARM) or similar processors that can provide post beam forming processing.

FPGA 214 may also control the radar receiver electronics which may include Rx mixer 204, the receiver integrated circuits (IC) 206, summing amplifier 210 and ADCs 212A-212D. The radar receiver electronics may include digital beam forming circuitry configured to receive radar reflections corresponding to the outputted radar signals, and to send signals associated with the radar reflections to FPGA 214. SIW Rx array element 200, acts as a radar receive antenna to collect radar reflections impinging on the surface of its slot layer. SIW Rx array element 200 may be a single SIW Rx array element 200 in a subarray 132A within the SIW Rx array 122, as depicted in FIG. 3B. The terms radar receiver electronics and radar receive electronics may be used interchangeably in this disclosure.

As described above in relation to FIGS. 4 and 6, radar receiver electronics that include a four-channel mixer IC, such as four-channel mixer IC 205, may provide advantages such as simplified signal routing, which also may help ensure signals are processed in phase without complex compensation. Some examples of four-channel mixer IC 205 may also include LNAs, output amplifiers, signal buffers and other components, further simplifying implementation of the radar receiver electronics.

FPGA 214 and digital synthesizer transmitter 216 may include circuitry that converts received radar signals to a lower frequency for further processing. Further processing may include beam steering, target detection and location as well as other functions. Other types of functions performed by FPGA 214 and digital synthesizer transmitter 216 may include in-phase and quadrature processing (I and Q), filtering, frequency, phase and amplitude control, modulation, direct digital synthesis (DDS) and other functions. The digital beam forming circuitry may be configured to operate in the ultrasonic frequency range. The digital beam forming as described above may provide advantages over using heterodyne mixing for beam forming on transmit or receive. In some examples, the radar system of this disclosure may use heterodyne single sideband image reject mixer to offset the VCO signal (e.g. 24 GHz) with the required offset (e.g. 16 MHz) and suppress one of two possible signals that would come from a mixer (e.g. 24 GHz+/−16 MHz) so that only the desired signal (e.g. 24 GHz+16 MHz) is passed.

The digital beam forming circuitry may process the receive signals into monopulse beams that may be used for accurate navigation as well as detection and tracking of targets, such as vehicles, people, unmanned aerial vehicles and the like. The monopulse beams may be used to determine an azimuth, elevation and range of the target from the radar system. As depicted in FIGS. 1A, 1B and 3A, radar system 10, 10A and 100 may perform monopulse analysis for each receive beam, such as receive beam 28, which may facilitate tracking multiple objects within the transmit beam 22 FOR. Monopulse receive beams may provide accurate angle and distance measurements as well as tracking of objects within the sub-areas covered by a receive beam.

A radar system according to the techniques of this disclosure, may have advantages over other radar systems because the configuration may result in reduced computing requirements. For example, FPGA 214 may not need to computer the electronic beam steering because beam steering on receive is achieved on the receive array using a downconverter and phase shifter (see downconverter and phase shifter 352 described below). The beam steering occurs at IF frequency and not at an RF frequency, e.g. 24 GHz. The phase shift commands for the steering are issued by FPGA 214, or MPSoC (e.g. FPGA plus ARM, described above) so that the beam is steered as desired. FPGA 214 may have a simplified task of computing range bin fast Fourier transforms (FFT). The elevation beam switching, described above in relation to FIG. 1B, also occurs on the face of the array with external components and may not need electronic beamforming processing, just the range bin FFT. This simplified implementation may provide advantages in cost, reliability, size and power consumption.

Figure 4B:
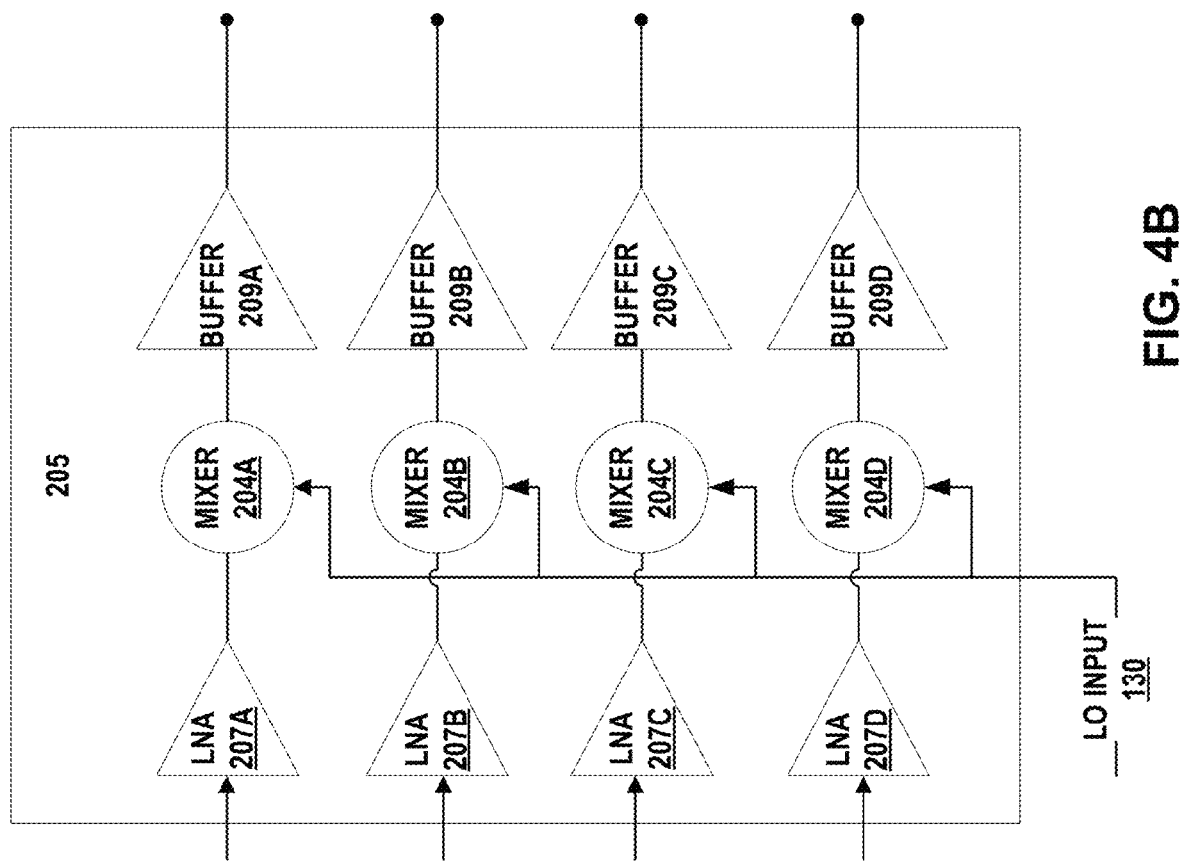
FIG. 4B is block diagram of an example a four-channel mixer IC.

FIG. 4B is block diagram of an example a four-channel mixer IC. Four-channel mixer IC 205 may include buffer amplifiers 209A-209D, low noise amplifiers 207A-207D and mixers 204A-204D. In some examples, four-channel mixer IC 205 may include other circuit elements, such as circuit protection elements, clock input, circuit test input and output, and similar components not shown in FIG. 4B. As described above in relation to FIG. 4A, an example of a four-channel mixer may include the ADF5904 from Analog Devices.

The output of each SIW Rx array elements 200 may connect to an input of a low noise amplifier (LNA), such as LNA 207A. In some examples, the input to each LNA may be preceded by a balun (not shown in FIG. 4B), which is used to connect a differential, balanced RF functional block, such as SIW Rx array elements 200 in some examples, to a single-ended, ground-referenced load, such as LNAs 207A-207D.

The output of each LNA 207A-207D connects to mixer 204A-204D, respectively. Each mixer 204A-204D may also receive as an input the signal from the local oscillator network via LO input 130 to four-channel mixer IC 205. Each mixer 2014A-204D functions as described above and below for mixer 204. In examples where the local oscillator input is a differential RF signal, the LO input 130 may also include a balun (not shown in FIG. 4B).

The output of each mixer 204A-204D may connect to the input of buffers 209A-209B, respectively. The outputs of buffers 209A-209D may connect to the phase shifting block, as described in relation to FIGS. 4-7. Four-channel mixer IC 205, may provide advantages such as simplified signal routing, which also may help ensure signals are processed in phase without complex compensation.

Figure 5:
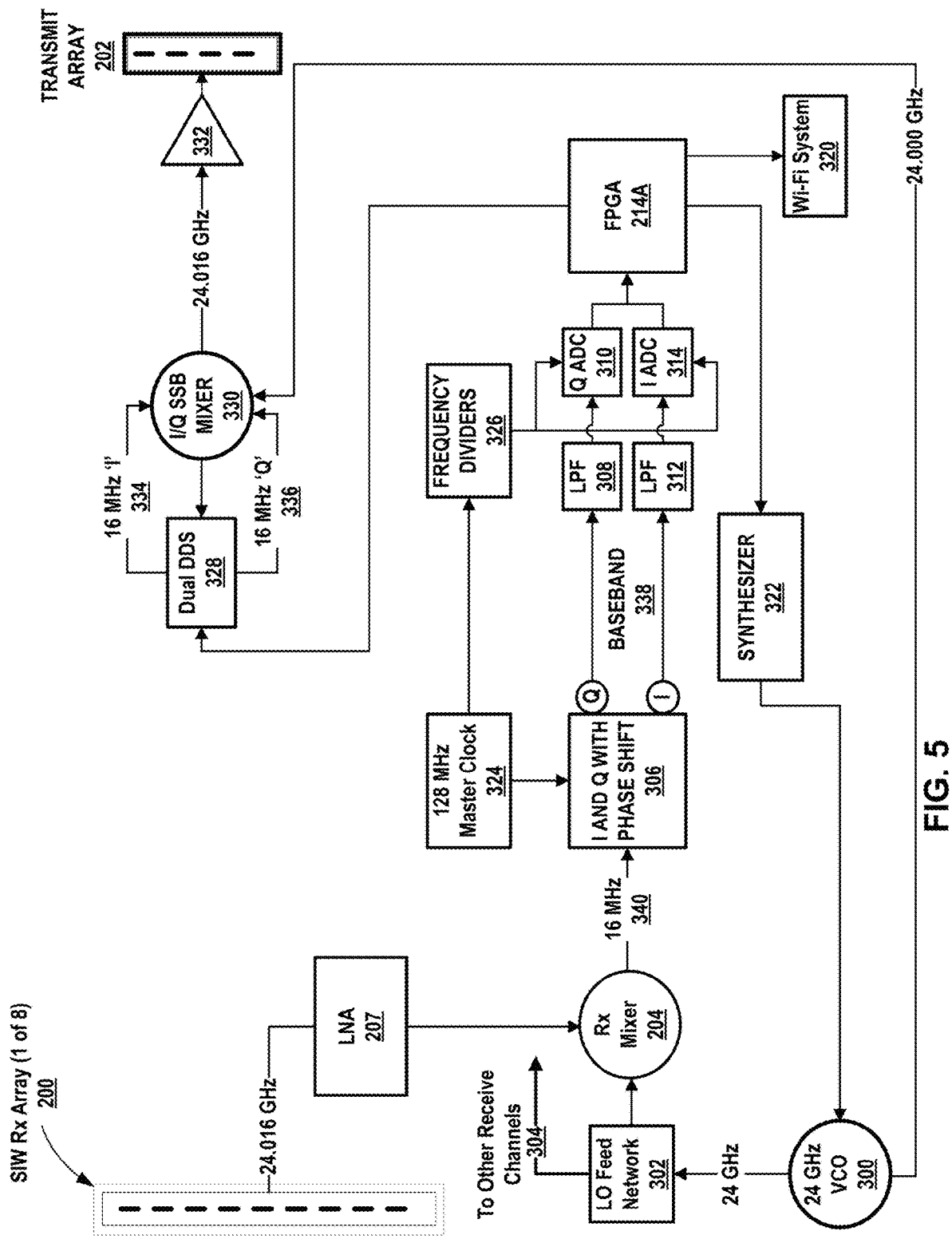
FIG. 5 is a conceptual schematic block diagram of an example radar receive channel and radar transmitter electronics in accordance with one or more techniques of this disclosure.

FIG. 5 is a conceptual and schematic block diagram of an example radar receive channel and radar transmitter electronics in accordance with one or more techniques of this disclosure. The example diagram of FIG. 5 depicts a single receive channel and an example implementation of superheterodyne up and down conversion between RF frequencies and other frequencies. Other receive channels that may be part of radar system are not shown in FIG. 5 for clarity.

FIG. 5 includes additional details of portions of radar system 100 using a slot waveguide antenna array shown in FIG. 4A. FIG. 5 may include SIW Rx array element 200, SIW Tx array 202 and Rx mixer 204 as shown in FIG. 4A. FPGA 214, digital synthesizer transmitter 216 and receiver IC 206 depicted in FIG. 4A may include some of the separate components depicted in FIG. 5. FIG. 5 depicts VCO 300, local oscillator (LO) feed network 302 and other receive channels 304, along with in-phase and quadrature (I and Q) unit 306, low pass filters (LPF) 308 and 312 and analog to digital converters 310 and 314. Other radar electronics may include FPGA 214A, synthesizer 322, 128 MHz master clock 324, frequency dividers 326, dual digital direct synthesis (DDS) unit 328, I/Q single side band (SSB) mixer 330, and amplifier 332. Also, communication system 320 may receive information from FPGA 214A. As described above, mixer 204 may be implemented by a four-channel mixer IC, e.g. four-channel mixer IC 205, which may provide advantages such as simplified routing and additional components such as LNAs for each channel. For example, four-channel mixer IC 205 may include LNA 207 between SIW Rx Array 200 and Rx Mixer 204, for each channel, as well as an input for LO Feed network 302.

The radar receiver electronics depicted in FIG. 5 may down-convert received radar signal from SIW Rx array element 200 to an intermediate frequency (IF) 16 MHz (340) and to lower frequencies for further processing, which may include receive beam steering. The radar transmitter electronics may transmit RF energy with a wide azimuth and narrow elevation through transmit (Tx) array 202. In other examples, the 16 MHz IF may be 12 MHz or some other intermediate frequency.

VCO 300, as shown in the example of FIG. 5, generates a 24 GHz signal which is distributed to the LO feed network 302 and further to Rx mixer 204. LO feed network 302 may function, for example, as an eight-way power divider. As described above, in some examples LO feed network 302 may output to LO input 130 of multiple four-channel mixer IC 205. Each four-channel mixer IC 205 may provide a four-way internal LO distribution to each of the four mixers as well as an LO buffer for each receive channel. VCO 300 also distributes 24 GHz to I/Q SSB mixer 330. VCO 300 may receive input from synthesizer 322. 24 GHZ is shown as one example. In other examples VCO 300 may generate other frequencies, such as 13 GHz.

LO Feed network 302 may output the 24.0 GHz LO signal to other receive channels 304 as well as Rx mixer 204, which functions the same as Rx mixer 204 shown in FIG. 4A. In the example of FIG. 5, Rx mixer 204 converts the 24.016 GHz reflected radar signal from SIW Rx array element 200 to an intermediate frequency (IF) of 16 MHz (340). These frequency values are only for illustration. Radar system 100 may also use other frequencies. Rx mixer 204 may output the IF of 16 MHz (340) to I and Q unit 306.

Synthesizer 322 may utilize a method of changing the division ratio within a digital PLL synthesizer to provide frequencies that are not integral multiples of the comparison frequency. A divider may take a fractional division ratio rather than an integer ratio by alternating between division ratios. One example may include a fractional N synthesizer that uses the basic digital PLL loop. Analog Devices component ADF4159, a direct modulation fractional-N frequency synthesizer, is one example of a fractional N synthesizer. However, in some examples fractional N synthesizers may generate spurious signals that appear as false targets in the receiver. Other examples of synthesizer 322 may include a direct digital synthesizer that may have advantages over a fractional N synthesizer.

Frequency synthesis may use various forms of Direct Digital Synthesizer, Phase Lock Loop, frequency multiplier and other methods. Synthesizer 322 will generate a linear FMCW waveform and may receive control and other inputs from FPGA 214A.

I and Q unit 306 may include a phase shift function along with the in-phase and quadrature function. A monopulse radar may need to get information both from the real and imaginary portions of the returned radar signal. I and Q unit 306 may provide a representation of the returned radar signal at the intermediate frequency (IF) of 16 MHz, as shown in FIG. 5. These frequencies listed in FIG. 5 are just for illustration. Other frequencies may also be used. The quadrature down conversion may divide the 128 MHz oscillator signal by eight, e.g. 8×16 MHz=128 MHz. Terms for 128 MHz master clock 324 may include reference oscillator, 128 MHz oscillator and 128 MHz clock. These terms may be used interchangeably in this disclosure.

I and Q unit 306 may perform two functions simultaneously. First, I and Q unit 306 may divide 128 MHz clock signal 324 by eight and provide a four-bit phase shift with digital control. At the same time as the four-bit phase shift, I and Q unit 306 may form the in-phase (I) and quadrature (Q) signal portions and downconvert the 16 MHz IF frequency to a base band 338 between 1 kHz and 2 MHz. The I and Q signal portions may also be called the "I" channel and "Q" channel. The output signal from I and Q unit 306 passes through LPF 308 and 312 and ADCs 310 and 314 may digitize each portion of the returned signal. ADCs 310 and 314 may receive input from frequency dividers 326. Both frequency dividers 326 and I and Q unit 306 may receive a 128 MHz clock signal from 128 MHz master clock 324. Frequency dividers 326 may output a signal to ADCs 310 and 314.

FPGA 214A may receive the separate I and Q signals from each receiver channel. FPGA 214A may combine and process the signals to determine the 3D position of obstacles within the radar coverage area, as shown in FIG. 1A. FPGA 214A may process obstacle information, including size, height, rate of closure and other information and send to Communication system 320. Communication system 320 may further send obstacle information of one or more display devices. One possible example of FPGA 214A may include the Xilinx XC7k70t 7-series FPGA.

Radar transmitter electronics may include dual DDS 328 and I/Q SSB mixer 330. Dual DDS 328 may receive commands and control inputs from FPGA 214A and output a 16 MHz intermediate frequency I signal 334 and Q signal 336 to I/Q SSB mixer 330. An example dual DDS may include the Analog Devices AD9958.

I/Q SSB mixer 330 may receive the signals from dual DDS 328, as well as a 24 GHz signal from VCO 300. I/Q SSB mixer 330 may output radar signals to amplifier 332 and further to SIW transmit array 202. One example of amplifier 332 may include the HMC863 from Analog Devices. SIW transmit array 202 may output the radar signals in the prescribed pattern. Any reflected radar signals may impinge on SIW Rx array element 200 and be conducted to the FPGA for processing.

Figure 6:
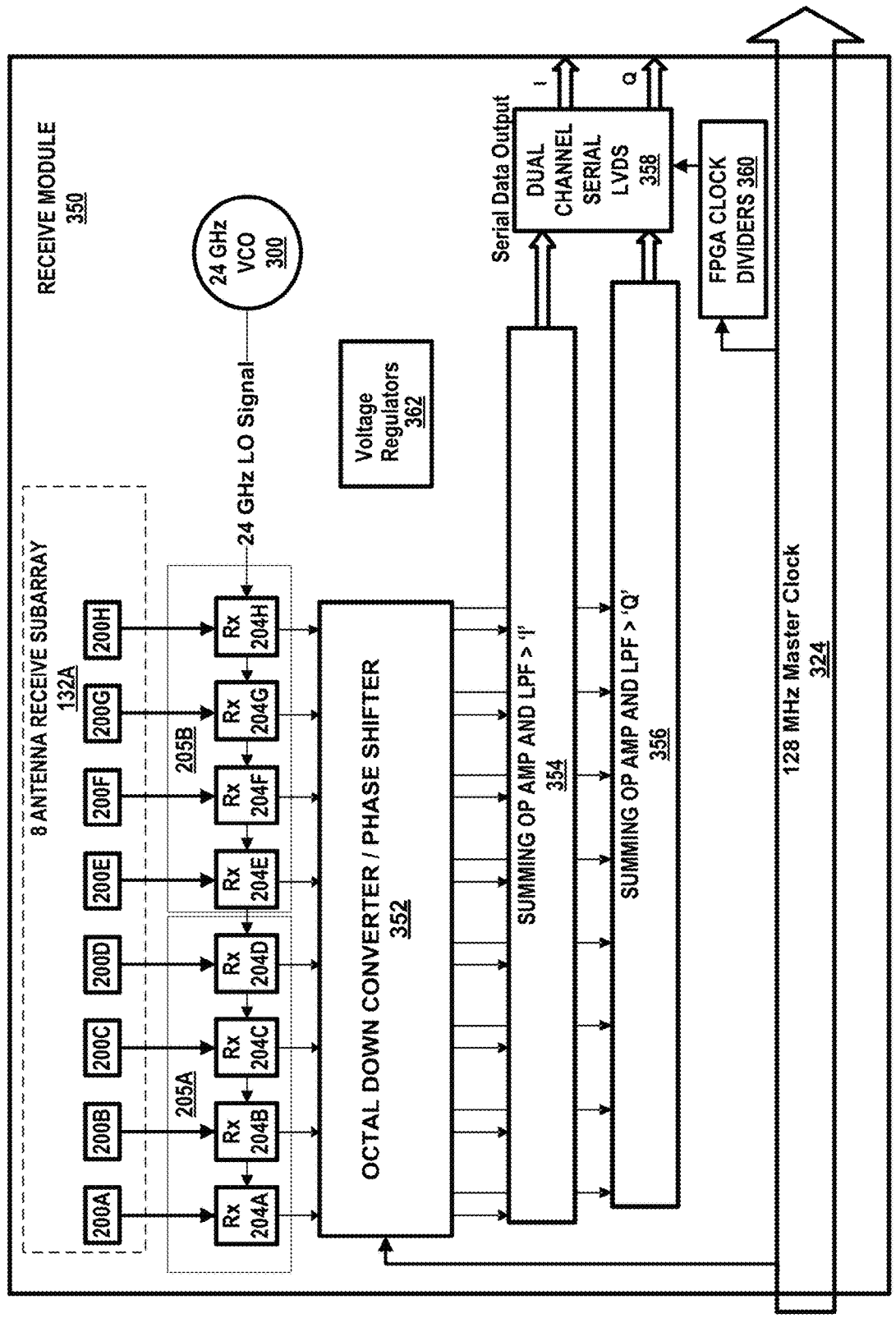
FIG. 6 is a conceptual block diagram of portions of an example receive module illustrating multiple channels that may be part of radar receive electronics in accordance with one or more techniques of this disclosure.

FIG. 6 is a conceptual block diagram of portions of an example receive module illustrating multiple channels that may be part of radar receive electronics in accordance with one or more techniques of this disclosure. FIG. 6 illustrates example components and techniques to process received radar signals from a portion of SIW receiver array 122 as shown in FIG. 3B. The example of FIG. 6 depicts other details of the functions of FIG. 4 and FIG. 5 that include an example radar receiver subarray 132A, such as that shown in FIG. 3B. A complete, radar system may use one or more sets of the components shown in FIG. 6. For example, a radar system that uses four radar receiver subarrays may use four sets of components as shown in FIG. 6 to achieve the 32 channels shown in FIG. 3B.

Receive module 350 may include radar receiver antenna subarray 132A, VCO 300, an Rx mixer 204A-204H for each channel, an octal downconverter and phase shifter 352, a summing operational amplifier (opamp) and LPF for both in-phase 354 ("I") and quadrature 356 ("Q") signals, a dual channel low voltage differential signaling (LVDS) unit 358, FPGA clock dividers 360 and voltage regulators 362. The components depicted in receive module 350 may be mounted and inter-connected on multi-layer PCB 101 that includes a, SIW antenna layer 102 and one or more circuit layers 103, shown in FIG. 3A.

The example of FIG. 6 depicts radar receiver antenna subarray 132A to include eight SIW Rx array elements 200A-200H. In other examples, radar receiver subarray 132A may include than eight SIW Rx array elements. Each SIW Rx array element 200A-200H connects to a respective Rx mixer 204A-204H. Each Rx mixer 204A-204H for each of the eight channels depicted in receive module 350 also receive a 24 GHz LO signal from VCO 300. The Rx mixers down-convert the reflected radar signal received by the SIW Rx array element for each channel and send the input to downconverter and phase shifter 352. The signal path for each channel may include components other than Rx mixers 204A-204H, as depicted by FIGS. 4, 5 and below in FIG. 7.

The example of FIG. 6 depicts an Rx mixer 204 for each channel. As described above in relation to FIG. 4A, other examples may use a four-channel mixer IC, e.g. 205A and 205B, rather than a single mixer for each channel, which may include additional components, such as low noise amplifier, not shown in FIG. 6. Example four-channel mixer components may include the ADF5904 from Analog Devices. A four-channel mixer IC, such as 205A and 205B, may have advantages over individual mixers and other components. For example, the LO network, e.g. LO feed network 302 depicted in FIG. 5 may be simplified because some examples of a four-channel mixer IC 205 may provide internal connections for LO distribution. LO network 302 may feed eight four-channel mixer ICs 205 rather than individual components.

As described above, mixer components may have performance advantages when placed in the middle of the SIW subarrays so that the path lengths between each subarray and the four-channel receiver chip is equal length. For example, this may allow the signal from VCO 300 to arrive at the same time and in the same phase for each receiver channel.

Downconverter and phase shifter 352 may perform a variety of functions for each of the eight channels. Some examples may include preamplification, harmonic rejection, anti-alias filtering, I/Q demodulation and phase rotation, digital demodulation and decimation as well as conversion to digital signals through ADC. One possible example component to perform at least some of the functions of downconverter and phase shifter 352 may include the Analog Devices AD9670 Octal Ultrasound Analog Front End (AFE) Receiver. Downconverter and phase shifter 352 may receive a 128 MHz clock input from 128 MHz master clock 324. Downconverter and phase shifter 352 may output an in-phase "I" signal for each channel to a set of summing opamp and low pass filters for each channel, depicted as a single unit 354 in the example of receive module 350. Similarly, Downconverter and phase shifter 352 may output a quadrature "Q" signal for each channel to a set of summing opamp and low pass filters for each channel, depicted as a single unit 356.

LVDS unit 358 may receive the "I" and "Q" inputs from summing opamp and low pass filters 354 and 356 as well as an input from FPGA clock dividers 360. LVDS unit 358 may operate under the LVDS, or TIA/EIA-644 technical standard to sample the input signals and perform analog-to-digital conversion. Example components that may perform one or more functions of LVDS unit 358 may include Analog Devices AD7357 or AD7356 differential input ADC components. LVDS unit 358 may output the digitized "I" and "Q" signals for further processing, such as beam forming, obstacle identification and other functions as needed by a portable radar system, in accordance with one or more techniques of this disclosure.

Receive module 350 may also include voltage regulators 362. Voltage regulators 362 may provide regulated power supplies to the components of receive module 350. For example, LVDS unit 358 may require an input voltage of 2.5V while downconverter and phase shifter 352 may require an input voltage of 3.0 V. Voltage regulators 362 may supply power for proper operation of each component in receive module 350.

Figure 7:
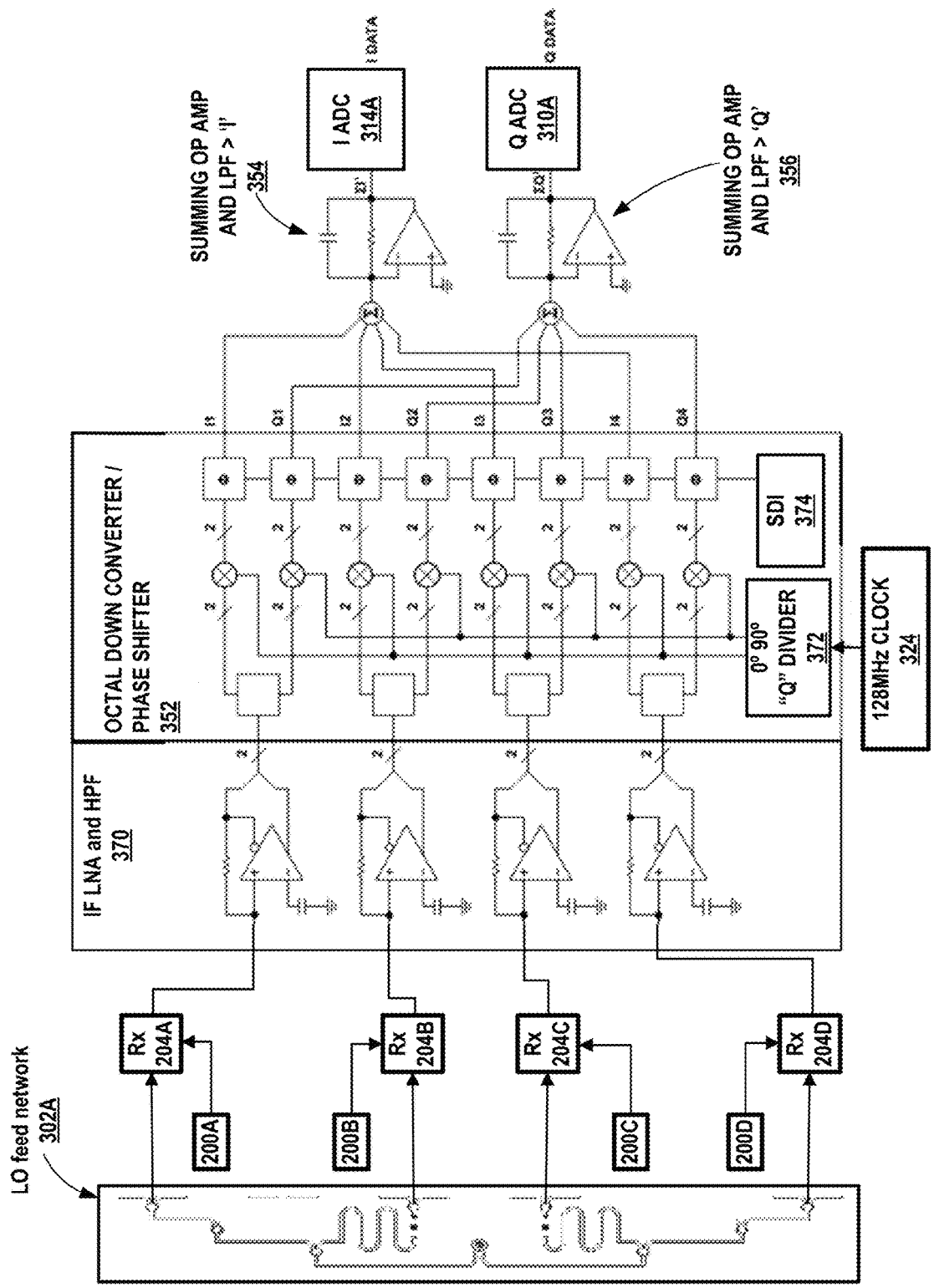
FIG. 7 is a conceptual schematic diagram depicting additional details of a portion of the radar receive electronics that may be included in a radar system.

FIG. 7 is a conceptual and schematic diagram depicting additional details of a portion of the radar receive electronics that may be included in a radar system. FIG. 7 depicts a four channel of example of radar receive electronics. In the example SIW receiver array 122 as shown in FIG. 3B, the set of electronics depicted in FIG. 7 would be repeated for the total number of channels in the receive array. Therefore, subarray 132A, with eight channels would connect to two examples of FIG. 7. FIG. 7 retains the same numbers for components where components in FIG. 7 perform the same function as in other figures. For example, SIW Rx array elements 200A-200D and 128 MHz master clock 324 perform the same function as those components shown in FIG. 6.

FIG. 7 illustrates some of the additional components that may be included in the radar receiver electronics, which may be mounted and interconnected on multi-layer PCB 101. FIG. 7 depicts LO feed network 302A, Rx mixers 204A-204D, SIW Rx array elements 200A-200D, intermediate frequency (IF) LNA and high pass filter (HPF) 370, downconverter and phase shifter 352, summing opamp and LPF 354 and 356 for the "I" and "Q" signals, "I" ADC 314A and "Q" ADC 310A. Also shown in the example of downconverter and phase shifter 352 is quadrature divider 372 and serial data in (SDI) controller 374.

LO feed network 302A may deliver a 24 GHz oscillator signal to Rx mixers 204A-204D. LO feed network 302A may receive as input the 24 GHz LO signal from a VCO, such as VCO 300, not shown in FIG. 7, but shown in FIGS. 5 and 6. The example of FIG. 7 depicts LO feed network 302A configured so each path length from the LO is the same length. This may ensure the signal from the LO, such as a VCO, arrives at each Rx mixer 204A-204D at the same time and with the same phase.

Rx mixers 204A-204D function the same as described above by receiving and downconverting the reflected radar signals from SIW Rx array elements 200A-200D. Rx mixers 204A-204D output the downconverted signals to the respective channels of IF LNA and HPF 370 (referred to as "LNA 370" for clarity). LNA 370 outputs each channel to a respective channel of downconverter and phase shifter 352. In the example of an FMCW radar, the high pass filter may set the frequency response of the receiver. In one example, a high pass filter may be used to set the IF response to have a 40 dB per decade response over a frequency range of about 1 KHz to 2 MHz. This function may exactly offset the propagation losses as a function of range.

Downconverter and phase shifter 352 functions the same as described above. Also depicted in FIG. 7 is quadrature divider 372, which may be part of the phase shift function that creates the "Q" output for the monopulse radar receive signals. SDI controller 374 may help manage the data flow to the summing op amps.

Summing opamp and LPF 354 and 356 may act as summing amplifier for the "I" and "Q" signals respectively. Summing opamp and LPF 354 and 356 may combine the signals from the various receive channels for further processing. The LPF portion may remove the upper sideband from the I/Q mixing function. In some examples, not shown in FIG. 7, the filtering function before "I" ADC 314A and "Q" ADC 310A may include an HPF followed by a LPF or anti-aliasing filter. The filtering function of the LPF or anti-aliasing filter before the ADCs is to stop all gain above the maximum frequency of the HPF. In some examples, the HPF maximum frequency may be 2 MHz.

"I" ADC 314A and "Q" ADC 310A perform the same function for the I and Q ADCs described above. "I" ADC 314A and "Q" ADC 310A digitize the four channels of downconverted and filtered radar receive channels and output the digitized signals for further processing, as described above.

Figure 8:
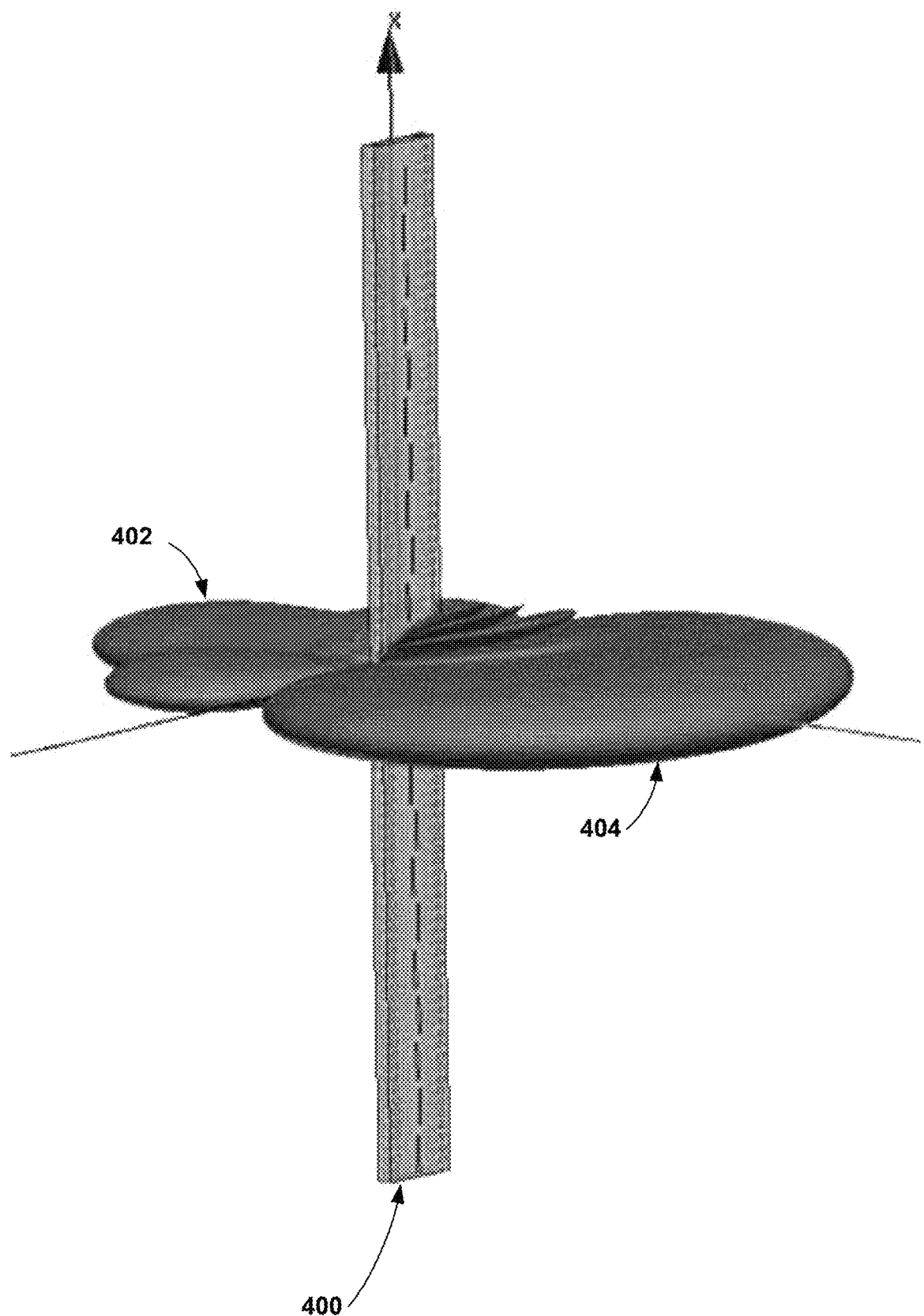
FIG. 8 is a conceptual diagram illustrating an example radar transmission pattern for a radar system, in accordance with one or more techniques of this disclosure.

FIG. 8 is a conceptual diagram illustrating an example radar transmission pattern for a radar system, in accordance with one or more techniques of this disclosure. FIG. 8 includes an example transmit antenna 400, a wide azimuth, narrow elevation main transmission beam 404 and sidelobes 402. In other words, the transmission beam 404 illuminates an area to a greater extent in a first illumination direction, such as azimuth, than in a second direction, such as elevation. The radar transmitter electronics, in conjunction with the radar transmit antenna 400, may be configured to output radar signals comprising a transmitted radar beamwidth of less than eight degrees in elevation and at least 65 degrees in azimuth. In some examples, the beamwidth may be at least 80 degrees in azimuth. Radar transmit antenna 400 may function in a similar manner to SIW transmit array 202 shown in FIG. 4A and SIW Tx antenna 126 shown in FIG. 3B. The example SIW transmit pattern may include low elevation sidelobes, which may have the advantages of preventing false alerts and erroneous detections.

Figure 9A:
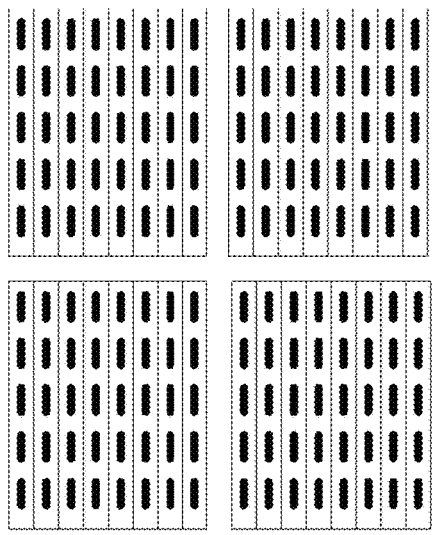
FIGS. 9A-9C are conceptual diagrams illustrating example radar receive pattern for a portable radar system, in accordance with one or more techniques of this disclosure.
Figure 9B:
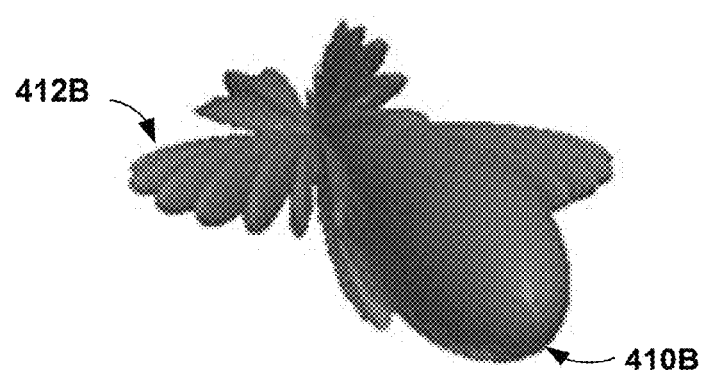
Figure 9C:
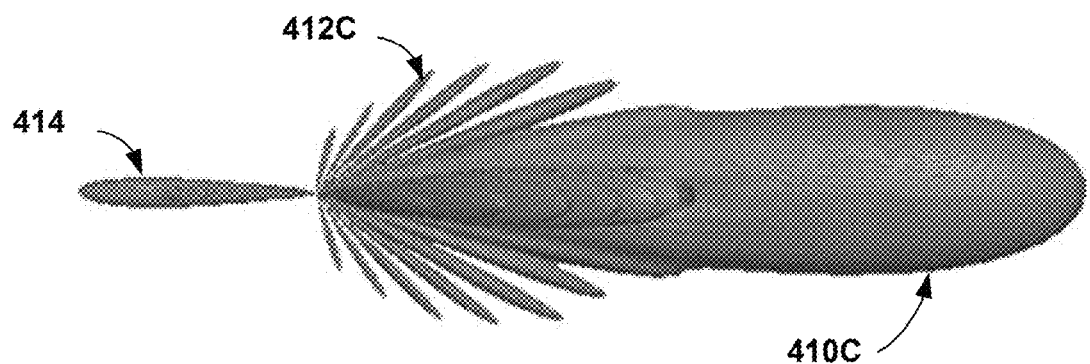

FIGS. 9A-9C are conceptual diagrams illustrating example radar receive pattern for a portable radar system, in accordance with one or more techniques of this disclosure. FIG. 9A includes an example slotted waveguide radar receive antenna 122A, which is similar to the SIW Rx array 122 shown in FIG. 3B. FIG. 9B depicts an example receive radar pattern with main receive lobe 410B and side lobes 412B. FIG. 9C depicts a side view of an example radar receive pattern including main lobe 410C, side lobes 412C and rear lobe 414. The beam steering radar receive pattern, may be controlled by the digital beam forming circuitry, described above. The radar receive pattern may include a target detection radar imaging resolution of at least three square meters at a range of 100 meters. The receive pattern may include a radar range resolution of at least 1 meter and radar angular resolution is no more than one and one-half degrees in azimuth and elevation.

Figure 10:
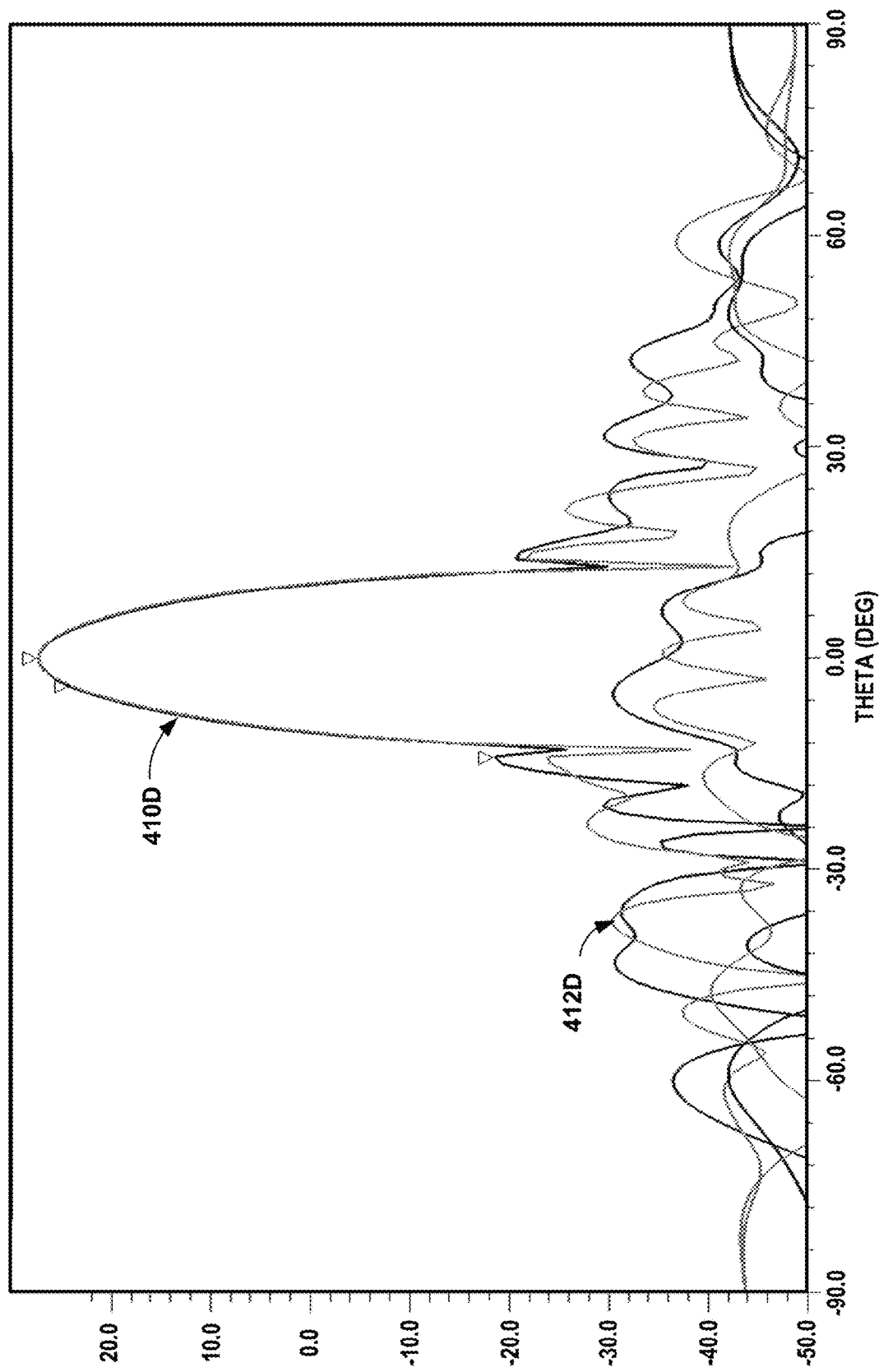
FIG. 10 is a graph illustrating an example radar receive pattern for a portable radar system, in accordance with one or more techniques of this disclosure.

FIG. 10 is a graph illustrating an example radar receive pattern for a portable radar system, in accordance with one or more techniques of this disclosure. The graph of FIG. 10 depicts a radar receive pattern similar to the patterns shown in FIGS. 9B-9C. FIG. 10 depicts main lobe 410D and side lobes 412D.

Various examples of the disclosure have been described. These and other examples are within the scope of the following claims.

The invention claimed is:

1. A radar system comprising:
   a transmit array comprising a plurality of transmit antenna elements;
   radar transmitter electronics in signal communication with the transmit array, wherein the radar transmitter electronics, in conjunction with the transmit array, are configured to output a frequency modulation continuous wave (FMCW) transmit beam that illuminates a fixed high aspect ratio field of regard (FOR) that is greater extent in a first illumination direction than in a second illumination direction,
   wherein the second illumination direction is substantially perpendicular to the first illumination direction, and
   a receive array comprising a plurality of receive antenna elements; and
   radar receiver electronics operable to receive a plurality of receive signals from the receive array; and
   processing circuitry operable to:
      within the radar receiver electronics, perform digital beam forming from the plurality of receive signals;
      determine one or more characteristics of a sub-area of the FOR illuminated by the fixed high aspect ratio FMCW transmit beam, wherein the digital beam forming results in a first digital beam and a first sub-area, and the processing circuitry is further operable to generate a second digital beam different from the first digital beam, and the processing circuitry is operable to determine one or more characteristics of a second sub-area simultaneously with determining characteristics of the first sub-area;
      establish a communication session with an external computing device via an application program interface (API), wherein the communication session comprises:
         receiving control inputs from the external computing device via the API;
         outputting a signal to an external display device, wherein the signal comprises:

target detection information in three dimensions, the three dimensions including range, azimuth, and elevation; and target movement characteristics, including relative velocity and angular velocity.

2. The radar system of claim 1, wherein the processing circuitry is further operable to include in the target detection information a distance, speed, elevation, acceleration, size or any combination thereof of a target object at a specific direction with respect to the radar system.

3. The radar system of claim 1, wherein the processing circuitry is further operable to:

determine a relative location of the radar system with respect to the external display device; and include the relative location of the radar system with respect to the external display device in the signal that is output to the external display device.

4. The radar system of claim 1, wherein the control inputs adapt the operation of the radar system.

5. The radar system of claim 4, wherein the control inputs comprise any one or more of a change to a transmit frequency, a change to a modulation scheme, or a change to a modulation frequency.

6. The radar system of claim 1, wherein the high aspect ratio FMCW transmit beam is in a millimeter frequency range.

7. The radar system of claim 1, wherein the high aspect ratio FMCW transmit beam is in a microwave frequency range.

8. The radar system of claim 1, wherein the signal output to the external display device is a first signal and the processing circuitry is further operable to:

receive a second signal from the external display device, the second signal comprising data associated with a location of the external display device;

in response to receiving the data associated with the location of the external display device, determine location coordinates and elevation coordinates of a target object relative to the location of the display device; and include the location coordinates and elevation coordinates of the target object in the first signal output to the external display device.

9. The radar system of claim 1, wherein the processing circuitry establishes the communication session using a wired communication link.

10. The radar system of claim 9, wherein the wired communication link comprises an Ethernet output.

11. The radar system of claim 1, wherein the processing circuitry is further operable to determine characteristics of ground-based features in the sub-area.

12. The radar system of claim 5, wherein the control inputs adapt the radar system for a low visibility environment.

13. The radar system of claim 1, wherein the processing circuitry is further operable to perform Doppler analysis on the digitally formed receive beams.

14. The radar system of claim 1, wherein the transmit electronics are further operable to change any one or more of a modulation waveform, modulation bandwidth or chirp time of the high aspect ratio FMCW transmit beam.

15. The radar system of claim 1, wherein the signal that is output to the external display device is compatible with a synthetic vision system (SVS).

16. The radar system of claim 1, wherein the radar receiver electronics are further operable to detect targets of cross-sectional area 0.5 $m^2$ at a range of one nm (1852 m).

17. The radar system of claim 1, wherein a radar imaging resolution of the target detection information is at least three square meters at a range of 100 meters.

18. The radar system of claim 1, wherein the transmit array, the receive array, radar receiver electronics, and the processing circuitry comprise a single, integrated package.

19. The radar system of claim 1, wherein a radar range resolution of the target detection information is at least 1 meter and a radar angular resolution is no more than one and one-half degrees in azimuth and elevation.

* * * * *